US008761583B2

(12) United States Patent
Shimizu

(10) Patent No.: US 8,761,583 B2
(45) Date of Patent: Jun. 24, 2014

(54) COMPUTER-READABLE STORAGE MEDIUM HAVING MOVING IMAGE GENERATION PROGRAM STORED THEREIN, COMPUTER-READABLE STORAGE MEDIUM HAVING MOVING IMAGE REPRODUCTION PROGRAM STORED THEREIN, MOVING IMAGE GENERATION APPARATUS, AND MOVING IMAGE REPRODUCTION APPARATUS

(75) Inventor: Hideaki Shimizu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 305 days.

(21) Appl. No.: 13/436,498

(22) Filed: Mar. 30, 2012

(65) Prior Publication Data

US 2012/0189267 A1 Jul. 26, 2012

Related U.S. Application Data

(62) Division of application No. 12/473,908, filed on May 28, 2009, now Pat. No. 8,204,365.

(30) Foreign Application Priority Data

Dec. 19, 2008 (JP) ................................ 2008-324146

(51) Int. Cl.
*H04N 5/93* (2006.01)

(52) U.S. Cl.
USPC ............ 386/282; 386/286; 386/280; 348/699; 382/309; 715/762; 717/110

(58) Field of Classification Search
USPC ............ 386/280, 282, 286; 348/699; 715/762; 717/110; 382/309
See application file for complete search history.

(56) References Cited

U.S. PATENT DOCUMENTS

| 4,591,931 | A | * | 5/1986 | Baumeister .................. 360/72.1 |
| 4,760,458 | A | | 7/1988 | Watanabe et al. |
| 4,956,725 | A | * | 9/1990 | Kozuki et al. ................. 386/241 |
| 6,388,684 | B1 | | 5/2002 | Iwamura et al. |
| 7,369,745 | B2 | * | 5/2008 | Hamada et al. ............... 386/278 |
| 7,702,184 | B2 | | 4/2010 | Aiso |

(Continued)

FOREIGN PATENT DOCUMENTS

| JP | 2003-173179 | 6/2003 |
| JP | 2007-336277 | 12/2007 |

OTHER PUBLICATIONS

Notice of Allowance issued for U.S. Appl. No. 12/473,908, dated Apr. 13, 2012.

(Continued)

*Primary Examiner* — Helen Shibru
(74) *Attorney, Agent, or Firm* — Nixon & Vanderhye, P.C.

(57) ABSTRACT

For lower load in image encoding, the present invention causes the CPU core to function as the following sections: an editing execution section for an editing process, including shifting process, of an unprocessed image which may undergo previous editing process, under user's input; a shift amount calculation section for calculating the shift amount of the resultant edited image; a difference data calculation section for obtaining difference data between the processed image and an image obtained through shifting of the unprocessed image by the calculated shift amount; and an image addition section for storing, in the image storage section, the calculated shift amount, and the obtained difference data, so as to be associated with each other.

10 Claims, 17 Drawing Sheets

(56) References Cited

U.S. PATENT DOCUMENTS

| 8,385,715 B2* | 2/2013 | Oyama | 386/224 |
| 2002/0110354 A1 | 8/2002 | Ikeda et al. | |
| 2005/0063585 A1 | 3/2005 | Matsuura | |
| 2010/0158472 A1 | 6/2010 | Shimizu | |

OTHER PUBLICATIONS

Japanese Office Action (Notice of Reasons for Rejection) issued for corresponding Japanese Patent Application No. 2008-324146, issued Aug. 14, 2012.

* cited by examiner

COMPUTER-READABLE STORAGE MEDIUM HAVING MOVING IMAGE GENERATION PROGRAM STORED THEREIN, COMPUTER-READABLE STORAGE MEDIUM HAVING MOVING IMAGE REPRODUCTION PROGRAM STORED THEREIN, MOVING IMAGE GENERATION APPARATUS, AND MOVING IMAGE REPRODUCTION APPARATUS

CROSS REFERENCE TO RELATED APPLICATION

This application is a divisional of U.S. patent application Ser. No. 12/473,908, filed May 28, 2009, now pending, which claims priority to the disclosure of Japanese Patent Application No. 2008-324146, filed Dec. 19, 2008. The entire contents of both of which are incorporated herein by reference.

BACKGROUND OF THE INVENTION

1. Field of the Invention

The present invention relates to a computer-readable storage medium having stored therein a moving image generation program for generating moving image information, and a moving image generation apparatus, and more particularly to a computer-readable storage medium having stored therein a moving image generation program executed by an information processing apparatus which performs an editing process, based on a predetermined operation input, for editing an initial image displayed by a display device, generates still image information through the editing process, and stores the still image information as moving image information, and a moving image generation apparatus. Further, the present invention relates to a computer-readable storage medium having stored therein a moving image reproduction program for reproducing moving image information, and a moving image reproduction apparatus, and more particularly to a computer-readable storage medium having stored therein a moving image reproduction program executed by an information processing apparatus for reproducing, in a forward direction, moving image information which is generated by using: an initial image which is initially displayed; a shift amount representing an amount of a shift between display images of predetermined frames; and difference data representing a difference between an image obtained by shifting, by the shift amount, a display image of a preceding one of the predetermined frames, and a display image of a following one of the predetermined frames, and for displaying, by means of a display device, the moving image information having been reproduced, the initial image, the shift amount, and the difference data being stored in image storage means, and to a moving image reproduction apparatus.

2. Description of the Background Art

Conventionally, as a method for storing moving image information, used is a method in which difference data representing a difference between data of adjacent frames is coded, and the coded difference data is stored. However, there is a problem that, when images of adjacent frames are greatly different from each other, it is difficult to efficiently encode the difference data representing the difference between data of the adjacent frames. In order to solve the problem, various methods, apparatuses, and the like have been suggested.

For example, in Patent Document 1 (Japanese Laid-Open Patent Publication No. 2007-336277), disclosed are an encoding method or apparatus for: detecting a motion vector of a frame in comparison with the immediately preceding frame in a sequence of frames, the motion vector representing a positional offset between the frames; allowing an image of the immediately preceding frame to shift, based on the detected motion vector; calculating difference data representing a difference between the shifted image and an image of the current frame; and encoding the difference data.

However, the conventional coding apparatus including the coding apparatus as described above, and the like, needs to detect for a motion vector based on images of adjacent frames. Therefore, processing load necessary for encoding image information is increased, and, in some cases, a time period for performing coding process is increased in an information processing apparatus which has reduced processing capacity.

SUMMARY OF THE INVENTION

The present invention is made to solve the problems described above, and an object of the present invention is to provide a computer-readable storage medium having stored therein a moving image generation program which enables reduction of processing load necessary for encoding image information, and a moving image generation apparatus which enables reduction of processing load necessary for encoding image information, and a computer-readable storage medium having stored therein a moving image reproduction program for reproducing moving image information generated by the moving image generation program and/or the moving image generation apparatus, and a moving image reproduction apparatus for reproducing moving image information generated by the moving image generation program and/or the moving image generation apparatus.

The present invention has the following features to attain the object mentioned above. The reference numerals and the figure numbers in the parentheses indicate an exemplary correspondence with the drawings in order to aid in understanding the present invention and are not intended to limit, in any way, the scope of the present invention.

The computer-readable storage medium having stored therein a moving image generation program (240) according to the present invention is a computer-readable storage medium having stored therein a moving image generation program (240) executed by an information processing apparatus (10) which performs an editing process, based on a predetermined operation input, for editing an initial image displayed by a display device (12), generates still image information through the editing process, and stores the still image information as moving image information.

A first aspect of the present invention is directed to the computer-readable storage medium having stored therein a moving image generation program which causes a computer (21, 24a) to function as: image storage means (243); unprocessed image display means (211); editing execution means (213); shift amount calculation means (212); difference data calculation means (214); and image addition means (216). The image storage means (243) previously stores information of the initial image. The unprocessed image display means (211) displays, by means of the display device (12), an unprocessed image which is a still image to be edited in the editing process and is associated with the information of the initial image stored in the image storage means (243).

The editing execution means (213) performs the editing process including a shifting process for shifting the unprocessed image in a predetermined direction based on the predetermined operation input, and generates a processed image which is an image obtained through the editing process. The shift amount calculation means (212) calculates a shift amount, based on the predetermined operation input, in the shifting process. The difference data calculation means (214) calculates difference data representing a difference between the processed image and an image obtained by shifting the unprocessed image by the shift amount calculated by the shift amount calculation means (212). The image addition means (216) stores, in the image storage means (243), the shift amount calculated by the shift amount calculation means (212), and the difference data calculated by the difference data calculation means (214) so as to be associated with each other.

The computer-readable storage medium according to a second aspect is the computer-readable storage medium having stored therein the moving image generation program (240) based on the first aspect, and the unprocessed image display means (211) displays the processed image which has been generated by the editing execution means (213) in the editing process immediately preceding the editing process to be currently performed, as the unprocessed image that is to be currently edited in the editing process. Further, the editing execution means (213) performs the editing process for editing the unprocessed image which is displayed by the unprocessed image display means (211), so as to generate the processed image which is an image obtained by editing the unprocessed image. Furthermore, the shift amount calculation means (212) calculates, as the shift amount to be currently obtained, the shift amount used in the shifting process included in the editing process being currently performed. Moreover, the difference data calculation means (214) calculates, as the difference data to be currently obtained, the difference data representing a difference between the processed image and an image obtained by shifting, by the shift amount calculated by the shift amount calculation means (212), the unprocessed image being currently edited in the editing process. In addition, the image addition means (216) stores, in the image storage means (243), the shift amount which is currently calculated by the shift amount calculation means (212), and the difference data which is currently calculated by the difference data calculation means (214), such that the shift amount and the difference data are associated with each other. Therefore, it is possible to reduce processing load necessary for encoding image information included in a moving image.

The computer-readable storage medium according to a third aspect is the computer-readable storage medium having stored therein the moving image generation program (240) based on the second aspect, and each of the unprocessed image display means (211), the editing execution means (213), the shift amount calculation means (212), the difference data calculation means (214), and the image addition means (216) is able to execute its function in a repetitive manner. Therefore, it is possible to reduce processing load necessary for encoding image information included in a moving image.

The computer-readable storage medium according to a fourth aspect is the computer-readable storage medium having stored therein the moving image generation program (240) based on the second aspect, and the moving image generation program (240) causes the computer (21, 24a) to further function as unprocessed image generation means for generating the still image based on the editing processes having been previously performed, by using the information of the initial image, the shift amount, and the difference data, the information of the initial image, the shift amount, and the difference data being stored in the image storage means (243). Further, the unprocessed image display means (211) displays the still image generated by the unprocessed image generation means, as the unprocessed image to be currently edited in the editing process. Therefore, it is possible to easily continue the editing process having been stopped (or it is possible to easily generate a moving mage following a moving image having been previously generated).

The computer-readable storage medium according to a fifth aspect is the computer-readable storage medium having stored therein the moving image generation program (240) based on the first aspect, and each of the unprocessed image and the processed image is an image associated with one of predetermined two colors in units of pixels. Further, the difference data calculation means (214) calculates the difference data by obtaining, in units of pixels, an exclusive OR of the processed image and an image obtained by shifting the unprocessed image by the shift amount calculated by the shift amount calculation means (212). Therefore, it is possible to obtain the difference data in a simple process.

The computer-readable storage medium according to a sixth aspect is the computer-readable storage medium having stored therein the moving image generation program (240) based on the first aspect, and the moving image generation program (240) causes the computer (21, 24a) to further function as coding means (215) for coding the difference data calculated by the difference data calculation means (214). Further, the image addition means (216) stores, in the image storage means (243), the difference data coded by the coding means (215). Therefore, it is possible to efficiently store a moving image.

The computer-readable storage medium according to a seventh aspect is the computer-readable storage medium having stored therein the moving image generation program (240) based on the sixth aspect, and the coding means (215) codes the difference data through a run length encoding. Therefore, it is possible to code a moving image by using a simple configuration.

The computer-readable storage medium according to an eighth aspect is the computer-readable storage medium having stored therein the moving image generation program (240) based on the first aspect, and the image storage means (243) stores the information of the initial image so as to be associated with frame number information, and the image addition means (216) stores, in the image storage means (243), the shift amount and the difference data so as to be associated with the frame number information. Therefore, it is possible to generate moving image information which is easily reproducible.

The computer-readable storage medium according to a ninth aspect is the computer-readable storage medium having stored therein the moving image generation program (240) based on the first aspect, and the moving image generation program (240) causes the computer (21, 24a) to further function as operation input means (15) for receiving an input from an operation component that makes the predetermined operation input. Further, the shift amount calculation means (212) calculates the shift amount based on an operation amount which is obtained from the operation component by the operation input means (15). Therefore, it is possible to accurately obtain the shift amount by using a simple configuration.

The computer-readable storage medium according to a tenth aspect is the computer-readable storage medium having stored therein the moving image generation program (240) based on the first aspect, and the computer (21, 24a) is caused to further function as operation input means for receiving an input from an operation component that makes the predetermined operation input. Further, the shift amount calculation means (212) calculates the shift amount based on a number of times the operation input means receives the predetermined operation input made by the operation component. Therefore, it is possible to accurately obtain the shift amount by using a simple configuration.

The computer-readable storage medium according to an eleventh aspect is the computer-readable storage medium having stored therein the moving image generation program (240) based on the first aspect, and the editing execution means (213) adds a portion of the unprocessed image which is shifted in the shifting process, to an outside of a display area to be displayed by the display device (12), so as to appear on a side, in the display area, opposite to a side from which the portion of the unprocessed image is shifted, and generates a shifted image. Therefore, it is possible to efficiently generate moving image information which can be reproduced in the reverse direction by using a simple configuration.

The computer-readable storage medium according to a twelfth aspect is a computer-readable storage medium having stored therein a moving image reproduction program (241) executed by the information processing apparatus (10) for reproducing, in a forward direction, the moving image information which is generated by executing the moving image generation program (240) stored in the computer-readable storage medium based on the first aspect, and is stored in the image storage means (243), so as to display, by means of a display device (12), the moving image information having been reproduced. The moving image reproduction program (241) causes the computer (21, 24a) of the information processing apparatus (10) to function as: unprocessed image display means (221); first data reading means (217); first shifting execution means (219); first image correction means (220); and first image display means (221).

The unprocessed image display means (221) displays the initial image as the unprocessed image by means of the display device (12). The first data reading means (217) reads, from the image storage means (243), the shift amount and the difference data corresponding to a reproduction time which immediately follows a reproduction time at which the unprocessed image is reproduced. The first shifting execution means (219) shifts the unprocessed image displayed by means of the display device (12), by the shift amount read by the first data reading means (217). The first image correction means (220) corrects an image obtained by shifting the unprocessed image by means of the first shifting execution means (219), by using the difference data read by the first data reading means (217). Further, the first image display means (221) displays, by means of the display device (12), an image which is obtained through correction made by the first image correction means (220). Therefore, it is possible to reproduce a moving image in the forward direction by using a simple configuration.

The computer-readable storage medium according to a thirteenth aspect is a computer-readable storage medium having stored therein a moving image reproduction program (241) executed by the information processing apparatus (10) for reproducing, in a reverse direction, the moving image information which is generated by executing the moving image generation program (240) stored in the computer-readable storage medium based on the eleventh aspect, and is stored in the image storage means (243), so as to display, by means of a display device (12), the moving image information having been reproduced. The moving image reproduction program (241) causes the computer of the information processing apparatus (10) to function as: second data reading means (222); second image correction means (224): second shifting execution means (225); and second image display means (226).

The second data reading means (222) reads, from the image storage means (243), the shift amount and the difference data corresponding to a predetermined reproduction time. The second image correction means (224) corrects an image displayed by the display device (12) at the predetermined reproduction time, by using the difference data read by the second data reading means (222). The second shifting execution means (225) shifts an image obtained through correction made by the second image correction means (224), by a shift amount obtained by reversing a symbol of the shift amount read by the second data reading means (222). Further, the second image display means (226) displays, by means of the display device (12), an image which is obtained through shifting performed by the second shifting execution means (225). Therefore, it is possible to reproduce a moving image in the reverse direction by using a simple configuration.

The computer-readable storage medium according to a fourteenth aspect stores a moving image reproduction program (241), and the moving image reproduction program (241) is a moving image reproduction program (241) executed by an information processing apparatus (10) for reproducing, in a forward direction, moving image information which is generated by using: an initial image which is initially displayed; a shift amount representing an amount of a shift between display images of predetermined frames; and difference data representing a difference between an image obtained by shifting, by the shift amount, a display image of a preceding one of the predetermined frames, and a display image of a following one of the predetermined frames, and for displaying, by means of a display device, the moving image information having been reproduced, the initial image, the shift amount, and the difference data being stored in image storage means (243), and the computer (21, 24a) of the information processing apparatus (10) is caused to function as unprocessed image display means (221); first data reading means (217); first shifting execution means (219); first image correction means (220); and first image display means (221).

The unprocessed image display means (221) displays the initial image as an unprocessed image by means of the display device (12). Further, the first data reading means (217) reads, from the image storage means (243), the shift amount and the difference data corresponding to a reproduction time which immediately follows a reproduction time at which the unprocessed image is reproduced. Furthermore, the first shifting execution means (219) shifts the unprocessed image displayed by means of the display device (12), by the shift amount read by the first data reading means (217). Moreover, the first image correction means (220) corrects an image obtained by shifting the unprocessed image by means of the first shifting execution means (219), by using the difference data read by the first data reading means (217). In addition, the first image display means (221) displays, by means of the display device (12), an image which is obtained through correction made by the first image correction means (220). Therefore, it is possible to reproduce a moving image in the forward direction by using a simple configuration.

The computer-readable storage medium according to a fifteenth aspect is the computer-readable storage medium having stored therein the moving image generation program (241) based on the fourteenth aspect, and each of the unprocessed image display means (221), the first data reading means (217), the first shifting execution means (219), the first image correction means (220), and the first image display means (221) is able to execute its function in a repetitive manner. Further, the image obtained through the correction made by the first image correction means (220) is used as the unprocessed image which is to be displayed by the unprocessed image display means (221) for an immediately following time. Therefore, it is possible to reproduce a moving image in the forward direction by using an increasingly simplified configuration.

The computer-readable storage medium according to a sixteenth aspect is the computer-readable storage medium having stored therein the moving image reproduction program (241) based on the fourteenth aspect, and each of the initial image, the unprocessed image, and the image obtained through the correction made by the first image correction means (220) is associated with one of predetermined two colors in units of pixels. Further, the first image correction means (220) makes the correction by obtaining, in units of pixels, an exclusive OR of the difference data and the image obtained through shifting performed by the first shifting execution means (219). Therefore, it is possible to reproduce a moving image in the forward direction by using an increasingly simplified configuration.

The computer-readable storage medium according to a seventeenth aspect is the computer-readable storage medium having stored therein the moving image reproduction program (241) based on the fourteenth aspect, and the difference data having been coded is stored in the image storage means (243). Further, the computer (21, 24a) is caused to further function as decoding means (218). The decoding means (218) decodes the difference data having been coded, the difference data being read by the first data reading means (217). Furthermore, the first image correction means (220) makes the correction by using the difference data decoded by the decoding means (218). Therefore, it is possible to reproduce a coded moving image in the forward direction.

The computer-readable storage medium according to an eighteenth aspect is the computer-readable storage medium having stored therein the moving image reproduction program (241) based on the seventeenth aspect, and the difference data is coded through a run length encoding, and stored in the image storage means (243). Therefore, it is possible to reproduce, in the forward direction, a moving image having been coded through the run length encoding.

The computer-readable storage medium according to a nineteenth aspect is the computer-readable storage medium having stored therein the moving image reproduction program (241) based on the fourteenth aspect, and the image storage means (243) stores the initial image, the shift amount, and the difference data so as to be associated with frame number information. Therefore, it is possible to reproduce a moving image in the forward direction by using an increasingly simplified configuration.

The computer-readable storage medium according to a twentieth aspect is the computer-readable storage medium having stored therein the moving image reproduction program (241) based on the fourteenth aspect. The moving image reproduction program (241) causes the computer (21, 24a) to further function as: second data reading means (222): second image correction means (224): second shifting execution means (225); and second image display means (226). The second data reading means (222) reads, from the image storage means (243), the shift amount and the difference data corresponding to a predetermined reproduction time. Further, the second image correction means (224) corrects an image displayed by the display device (12) at the predetermined reproduction time, by using the difference data read by the second data reading means (222). Furthermore, the second shifting execution means (225) shifts an image obtained through correction made by the second image correction means (224), by a shift amount which is obtained by reversing a symbol of the shift amount read by the second data reading means (222). Moreover, the second image display means (226) displays, by means of the display device (12), an image obtained through shifting performed by the second shifting execution means (225). It is possible to reproduce a moving image in the reverse direction by using a simple configuration.

A moving image generation apparatus (21, 24a) according to a twenty-first aspect is a moving image generation apparatus (21, 24a) for performing an editing process, based on a predetermined operation input, for editing an initial image displayed by a display device (12), generating still image information through the editing process, and storing the still image information as moving image information, and the moving image generation apparatus comprises: image storage means (243): unprocessed image display means (211); editing execution means (213); shift amount calculation means (212); difference data calculation means (214); and image addition means (216). The image storage means (243) previously stores information of the initial image. The unprocessed image display means (211) displays, by means of the display device (12), an unprocessed image which is a still image to be edited in the editing process and is associated with the information of the initial image stored in the image storage means (243).

The editing execution means (213) performs the editing process including a shifting process for shifting the unprocessed image in a predetermined direction based on the predetermined operation input, and generates a processed image which is an image obtained through the editing process. The shift amount calculation means (212) calculates a shift amount, based on the predetermined operation input, in the shifting process. The difference data calculation means (214) calculates difference data representing a difference between the processed image and an image obtained by shifting the unprocessed image by the shift amount calculated by the shift amount calculation means (212). The image addition means (216) stores, in the image storage means (243), the shift amount calculated by the shift amount calculation means (212), and the difference data calculated by the difference data calculation means (214) so as to be associated with each other.

A moving image reproduction apparatus (21, 24a) according to a twenty-second aspect is a moving image reproduction apparatus (21, 24a) for reproducing, in a forward direction, moving image information which is generated by using: an initial image which is initially displayed; a shift amount representing an amount of a shift between display images of predetermined frames; and difference data representing a difference between an image obtained by shifting, by the shift amount, a display image of a preceding one of the predetermined frames, and a display image of a following one of the predetermined frames, and for displaying, by means of a display device, the moving image information having been reproduced, the initial image, the shift amount, and the difference data being stored in image storage means (243), and the moving image reproduction apparatus comprises: unprocessed image display means (221); first data reading means (217); first shifting execution means (219); first image correction means (220); and first image display means (221).

The unprocessed image display means (221) displays the initial image as an unprocessed image by means of the display device (12). Further, the first data reading means (217) reads, from the image storage means (243), the shift amount and the difference data corresponding to a reproduction time which immediately follows a reproduction time at which the unprocessed image is reproduced. Furthermore, the first shifting execution means (219) shifts the unprocessed image displayed by means of the display device (12), by the shift amount read by the first data reading means (217). Moreover, the first image correction means (220) corrects an image obtained by shifting the unprocessed image by means of the first shifting execution means (219), by using the difference data read by the first data reading means (217). In addition, the first image display means (221) displays, by means of the display device (12), an image which is obtained through correction made by the first image correction means (220). Therefore, it is possible to reproduce a moving image in the forward direction by using a simple configuration.

In the moving image generation program (240) and the moving image generation apparatus (21, 24a) according to the present invention, the shift amount calculation means (212) calculates the shift amount in the shifting process, based on an operation input received by the editing execution means (213). Therefore, it is possible to accurately obtain the shift amount in the shifting process by using a simple configuration, thereby reducing the processing load necessary for encoding image information.

In other words, when, for example, the shift amount in the shifting process is received as an operation amount from an operation component by the operation input means (15), the shift amount calculation means (212) obtains the shift amount based on the operation amount inputted from the operation component. Therefore, the shift amount calculation means (212) may simply obtain, as the shift amount, the operation amount which is received through the operation input means (15).

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
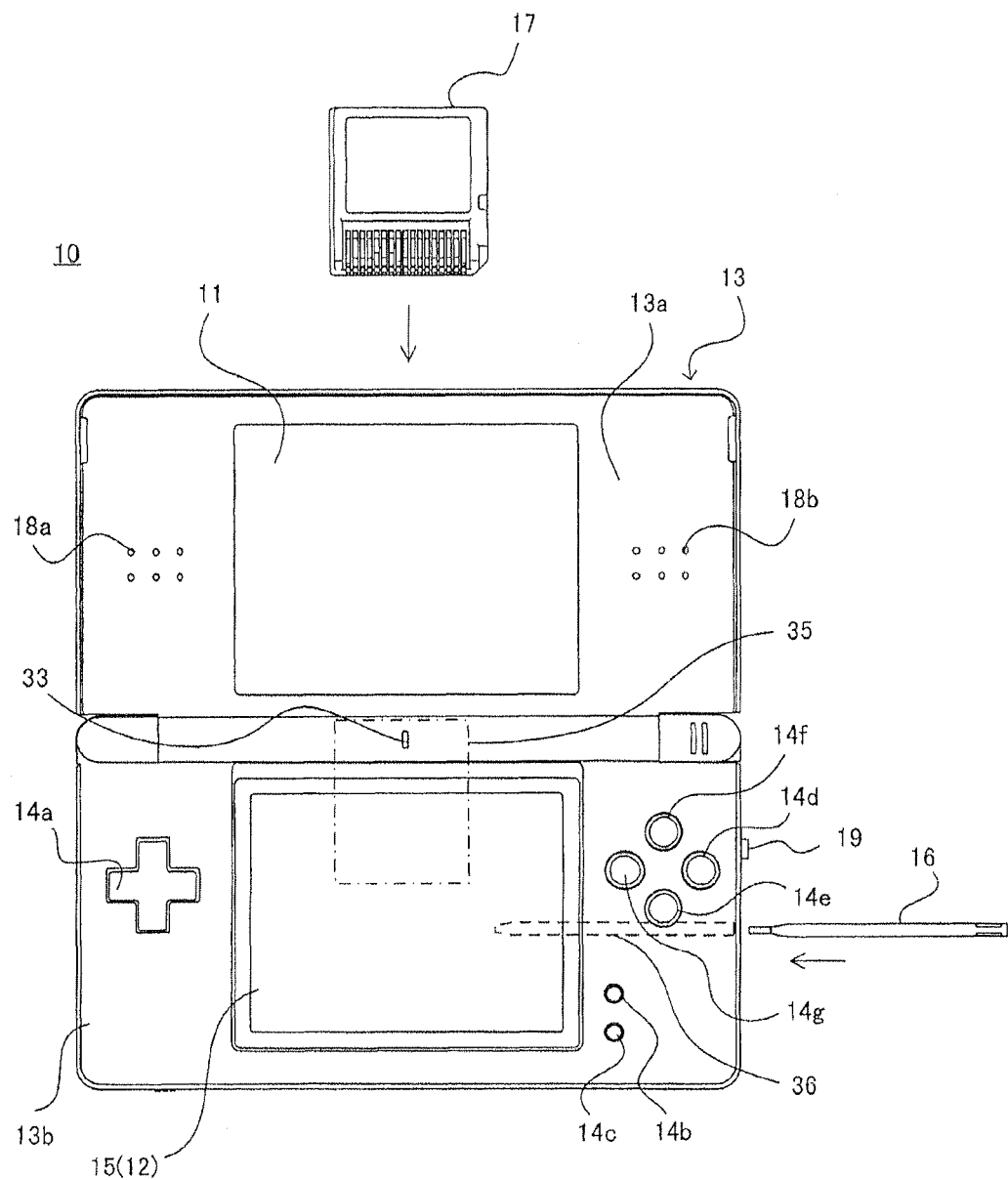
FIG. 1 is a view showing an outer appearance of a game apparatus according to an embodiment of the present invention.

Hereinafter, an embodiment of the present invention will be described. FIG. 1 is a view showing an outer appearance of a game apparatus according to the embodiment of the present invention. The present invention is applicable to a stationary game apparatus as well as a hand-held game apparatus. Further, the present invention is applicable to not only a game apparatus but also an information processing apparatus (for example, a personal computer, a mobile telephone, and the like) having a function of performing multiple editing processes for editing a previously stored initial image in accordance with an operation input made from the outside, generating still image information for each editing process, and storing the still image information as moving image information.

In FIG. 1, a game apparatus 10 (corresponding to an information processing apparatus) includes a first liquid crystal display (hereinafter, referred to as "an LCD") 11 and a second LCD 12. A housing 13 includes an upper housing 13a and a lower housing 13b. The first LCD 11 is accommodated in the upper housing 13a and the second LCD 12 is accommodated in the lower housing 13b. Each of the first LCD 11 and the second LCD 12 has a resolution of 256 dots×192 dots. Although, in the present embodiment, an LCD is used as a display device, any other display device, for example, a display device using EL (electro luminescence), can be used. Further, any resolution may be used for each of the first LCD 11 and the second LCD 12.

On the upper housing 13a, provided are sound holes 18a and 18b for outputting a sound from a pair of loudspeakers (30a and 30b shown in FIG. 2) described below. Further, a microphone hole 33 is provided in a hinge portion for connecting between the upper housing 13a and the lower housing 13b such that the upper housing 13a and the lower housing 13b are openable and closable.

On the lower housing 13b, provided as input devices are a cross switch 14a, a start switch 14b, a select switch 14c, an A button 14d, a B button 14e, an X button 14f, and a Y button 14g. Provided on the side surface of the lower housing 13b are an L button and an R button which are not shown. Further, the second LCD 12 has a touch panel 15 mounted on the screen thereof as another input device. Moreover, provided on the side surface of the lower housing 13b are a power switch 19, a receptacle 35 (indicated by a dashed-dotted line shown in FIG. 1) into which a memory card 17 is inserted, and a receptacle 36 (indicated by a dashed line shown in FIG. 1) into which a stick 16 may be inserted.

The touch panel 15 may be of any type such as a resistive film type, an optical type (infrared type), or a capacitive coupling type. The touch panel 15 may be operated by using not only the stick 16 but also a finger or the like. In the present embodiment, the touch panel 15 has a resolution (detection accuracy) of 256 dots×192 dots, similar to the resolution of the second LCD 12. However, the touch panel 15 need not necessarily have the same resolution as the second LCD 12.

The memory card 17 includes: a ROM 17a for storing a moving image generation program and a moving image reproduction program of the present invention, and the like; and a flash memory 17b for storing backup data so as to be rewritable. The memory card 17 is detachably inserted into the receptacle 35 provided in the lower housing 13b. A first connector 23a (not shown in FIG. 1 but see FIG. 2) is provided in the deep recess of the receptacle 35 so as to connect to a connector which is provided at the head, of the memory card 17, pointing to the direction in which the memory card 17 is inserted, such that current flows between the first connector 23a and the connector of the memory card 17. When the memory card 17 is inserted into the receptacle 35, the first connector 23a and the connector of the memory card 17 are connected to each other such that current flows therebetween, so that a CPU core 21 (see FIG. 2) of the game apparatus 10 can access the memory card 17.

Figure 2:
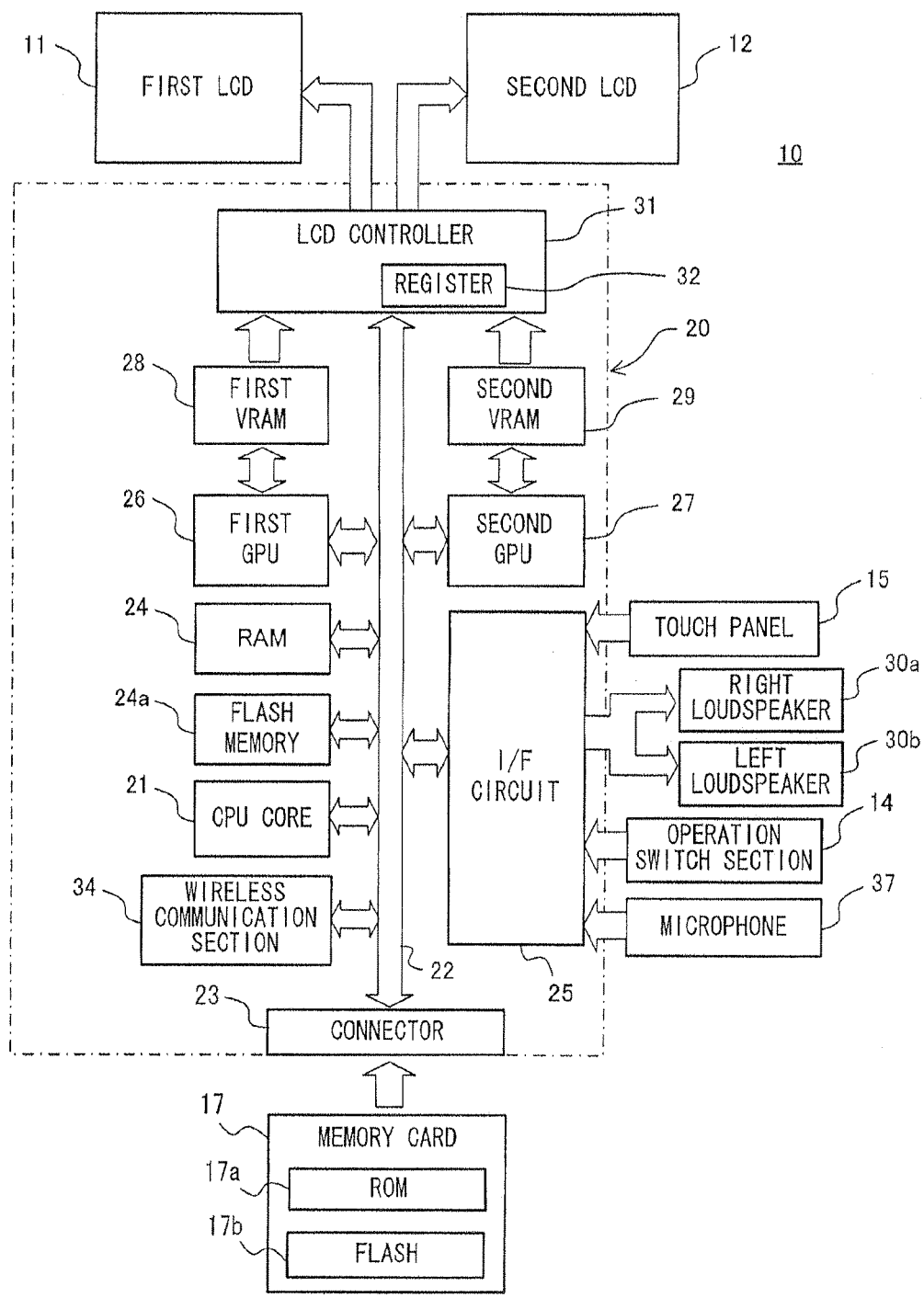
FIG. 2 is a diagram illustrating an internal structure of the game apparatus.

Next, with reference to FIG. 2, the internal structure of the game apparatus 10 will be described. FIG. 2 is a block diagram illustrating an internal structure of the game apparatus 10. In FIG. 2, the CPU core 21 is mounted on an electronic circuit board 20 accommodated in the housing 13. Via a bus 22, the CPU core 21 is connected to a connector 23, an input/output interface circuit (denoted as an I/F circuit in FIG. 2) 25, a first graphics processing unit (hereinafter, referred to as "GPU") 26, a second GPU 27, a RAM 24, a flash memory 24a, an LCD controller 31, and a wireless communication section 34. The memory card 17 is detachably connected to the connector 23. The touch panel 15, the right loudspeaker 30a, the left loudspeaker 30b, an operation switch section 14 including the cross switch 14a, the A button 14d and the like as shown in FIG. 1, and a microphone 37 are connected to the I/F circuit 25. The right loudspeaker 30a and the left loudspeaker 30b are placed inside the sound holes 18a and 18b, respectively. The microphone 37 is provided inside the microphone hole 33.

The first GPU 26 is connected to a first video-RAM (hereinafter, referred to as "VRAM") 28. The second GPU 27 is connected to a second VRAM 29. In accordance with an instruction from the CPU core 21, the first GPU 26 generates a first display image, and writes image information into the first VRAM 28. Similarly, in accordance with an instruction from the CPU core 21, the second GPU 27 generates a second display image, and writes image information into the second VRAM 29. The first VRAM 28 and the second VRAM 29 are connected to the LCD controller 31.

The LCD controller 31 includes a register 32. The register 32 stores a value "0" or "1" in accordance with an instruction from the CPU core 21. When the register 32 stores a value "0", the LCD controller 31 outputs to the first LCD 11 the first display image which has been written into the first VRAM 28, and outputs to the second LCD 12 the second display image which has been written into the second VRAM 29. On the other hand, when the register 32 stores a value "1", the LCD controller 31 outputs to the second LCD 12 the first display image which has been written into the first VRAM 28, and outputs to the first LCD 11 the second display image which has been written into the second VRAM 29.

The flash memory 24a may be a NAND flash memory or the like. The flash memory 24a stores a moving image generation program and a moving image reproduction program of the present invention, and image information. That means that the flash memory 24a functions as a part of a moving image generation apparatus or a moving image reproduction apparatus of the present invention. The insertion of the memory card 17 into the receptacle 35 allows the moving image generation program and the moving image reproduction program to be read from the ROM 17a of the memory card 17, and stored in the flash memory 24a. Further, when the CPU core 21 executes the moving image generation program or the moving image reproduction program, the programs are read from the flash memory 24a, and stored in the RAM 24, from which the CPU core 21 executes the programs.

Figure 3A:
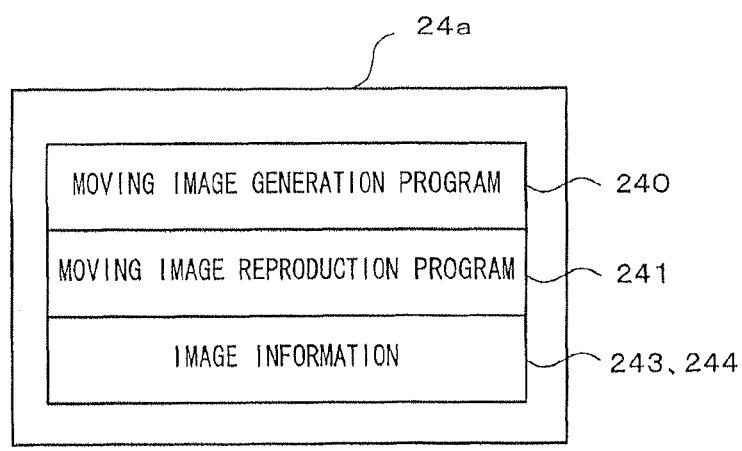
FIG. 3A shows a memory map of a flash memory.
Figure 3B:
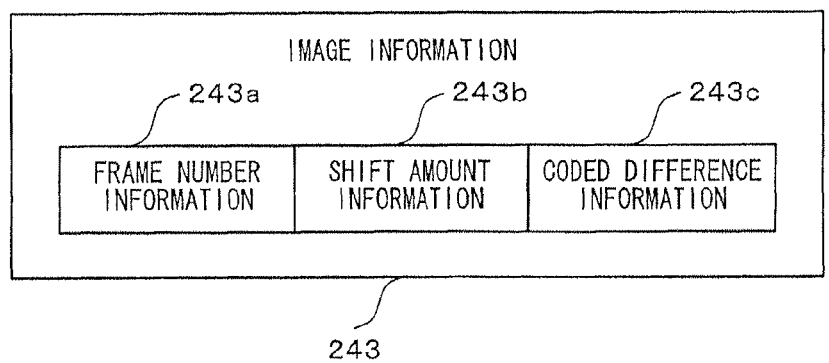
FIG. 3B shows a memory map of a flash memory.

FIG. 3A and FIG. 3B show a memory map of the flash memory 24a. As shown in FIG. 3A, the flash memory 24a stores a moving image generation program 240 and a moving image reproduction program 241 of the present invention. Further, as described below with reference to FIG. 4, FIG. 6, and FIG. 8, the flash memory 24a includes an image storage section 243 and a reproducible image storage section 244, for storage of image information. The image storage section 243 stores image information generated by executing the moving image generation program 240. Further, when the moving image reproduction program 241 reproduces, in the forward direction of the frames, the image information stored in the image storage section 243, the reproducible image storage section 244 stores image information of a frame immediately preceding a frame being currently reproduced. In addition, when the moving image reproduction program. 241 reproduces, in the reverse direction of the frames, the above image information, the reproducible image storage section 244 stores image information of a frame immediately following the frame being currently reproduced.

FIG. 3B shows a memory map for respective frames which include image information stored in the image storage section 243. The image information for each of the frames includes frame number information 243a, shift amount information 243b, and coded difference information 243c. The frame number information 243a is information of a number to identify one of the frames. This number is assigned to the frame when an image addition section 216 described below adds the image information of the frame in the image storage section 243. The shift amount information 243b is information representing shift amounts ΔX and ΔY which are calculated for the left-right (horizontal) and for the upward-downward (vertical) directions, respectively, in the shifting process, by a shift amount calculation section 212 described below. The coded difference information 243c is coded information of difference data obtained through calculation in the difference data calculation section 214 described below. The coding of the difference data is performed in a coding section 215 described below.

In the present embodiment, the CPU core 21 used when a "computer" is provided in the game apparatus 10 will be described. However, a CPU, an MPU, or the like used when a "computer" is provided in another device (for example, a mobile telephone, a PDA (Personal Digital Assistant), a personal computer, or the like) is also usable.

Figure 4:
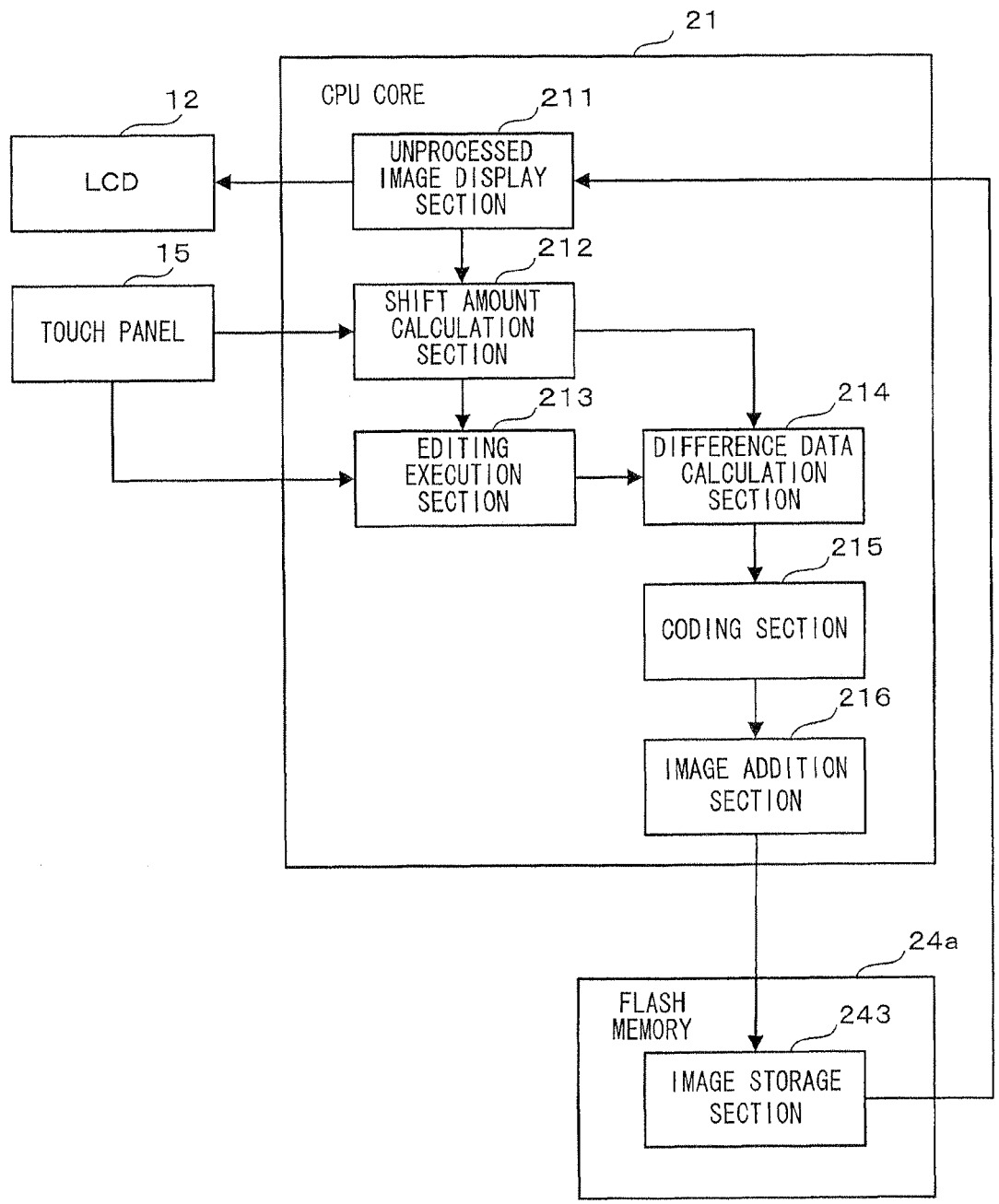
FIG. 4 is a block diagram illustrating an exemplary functional structure of a moving image generation apparatus according to the present invention.

FIG. 4 is a block diagram illustrating an exemplary functional structure of the moving image generation apparatus according to the present invention. The CPU core 21 (corresponding to a part of the moving image generation apparatus)

functionally includes an unprocessed image display section 211, the shift amount calculation section 212, an editing execution section 213, the difference data calculation section 214, the coding section 215, and the image addition section 216. The flash memory 24a (corresponding to a part of the moving image generation apparatus) functionally includes the image storage section 243.

When the CPU core 21 executes the moving image generation program 240 (see FIG. 3) which is previously stored in the flash memory 24a or the like, the CPU core 21 functions as functional sections such as the unprocessed image display section 211, the shift amount calculation section 212, the editing execution section 213, the difference data calculation section 214, the coding section 215, and the image addition section 216, and causes the flash memory 24a to function as a functional section such as the image storage section 243.

The image storage section 243, corresponding to image storage means, is a functional section for storing information of a predetermined initial image. Further, when the user edits the image or a still image of images obtained through the preceding editing processes of the initial image, the image addition section 216 will record, in the image storage section 243, the information of the still image processed in the current editing process. That is, the image storage section 243 is a functional section for storing moving image information generated by the moving image generation apparatus according to the present invention. Further, when the user plays the moving image sequence, the moving image information stored in the image storage section 243 is read by a first data reading section 217 shown in FIG. 6, and/or a second data reading section 222 shown in FIG. 8.

The unprocessed image display section 211, corresponding to unprocessed image display means, is a functional section to display, on the second LCD 12, an "unprocessed image" information stored in the image storage section 243. The "unprocessed image" is an initial image or a still image obtained through the preceding editing processes of the initial image. The unprocessed image display section 211 allows a user to edit, by using the touch panel 15, the unprocessed image displayed on the second LCD 12 in order to obtain a desired image as the processed image of the editing process. The allowed editing process includes, for example, movement, addition, deletion, and deformation of an object in the image.

The editing execution section 213, corresponding to editing execution means, is a functional section to receive an operation input from a user through the touch panel 15 or the like; and to execute an editing process based on the operation input having been received, that is, to make a change in an unprocessed image displayed on the second LCD 12 by the unprocessed image display section 211; in order to obtain a desired image as a currently edited or produced image. The editing process also includes a shifting process for moving the unprocessed image displayed on the second LCD 12 by the unprocessed image display section 211, in either or both of horizontal and vertical directions.

Further, in the shifting process of an unprocessed image corresponding to a still image obtained through the preceding editing processes, the editing section 213 functions to shift the unprocessed image in a direction with a portion of the shifted image not visually displayed on the display interface; to combine the portion to the shifted image so as to appear on the opposite side to the side from which the portion of the unprocessed image has been shifted outward; and to display on the interface the combined image as the resultant image of the shifting process. In other words, the editing section 213 performs the shifting process such that the upper portion and the lower portion of the unprocessed image are virtually jointed to each other, and/or the left portion and the right portion of the unprocessed image are virtually jointed to each other. Specifically, the editing section 213 performs a so-called "spherical scrolling" as the shifting process.

Specifically, when, for example, an unprocessed image is shifted in the shifting process such that the upper end portion of the unprocessed image is positioned outside the display area, the editing execution section 213 adds a portion (=the upper end portion of the unprocessed image) to be positioned outside the display area after the shifting process, so as to appear in the lower end area of the display area, thereby generating a shifted image. Further, when, for example, an unprocessed image is shifted in the shifting process such that the left end portion of the unprocessed image is positioned outside the display area, the editing execution section 213 adds a portion (=the left end portion of the unprocessed image) to be positioned outside the display area after the shifting process, so as to appear in the right end area of the display area, thereby generating a shifted image.

As described above, the editing execution section 213 performs a so-called "spherical scrolling" in the shifting process, and therefore the moving image information which is reproducible in the reverse direction can be efficiently generated by using a simple configuration as described below with reference to FIG. 8 and FIG. 9. That is, the editing execution section 213 performs a so-called "spherical scrolling" in the shifting process, so that all the image information of the unprocessed image is included in the image information obtained by shifting the unprocessed image (no image information is deleted in the shifting process), thereby generating a moving image which is reproducible in the reverse direction.

In the present embodiment, the editing execution section 213 performs the so-called "spherical scrolling" in the shifting process. However, the editing execution section 213 may not perform "spherical scrolling" in the shifting process. In this case, the generated moving image cannot be reproduced in the reverse direction. However, the moving image can be generated with enhanced efficiency.

The shift amount calculation section 212 (corresponding to shift amount calculation means) is a functional section for calculating, in the shifting process performed by the editing execution section 213, a shift amount $\Delta X$ and a shift amount $\Delta Y$ for the left-right direction and for the upward-downward direction, respectively, based on the operation input received by the editing execution section 213 through the touch panel 15 or the like.

Further, the shift amount calculation section 212 calculates the shift amounts $\Delta X$ and $\Delta Y$ based on a movement amount (for example, a movement amount indicated by the stick 16) over which an operation component (corresponding to the stick 16) used for the input onto the touch panel 15 is moved. Specifically, for example, the shift amount calculation section 212 determines, after the stick 16 touches the touch panel 15, a distance over which dragging is performed, and calculates the shift amounts $\Delta X$ and $\Delta Y$ based on the determined distance.

As described above, the shift amount calculation section 212 calculates the shift amounts $\Delta X$ and $\Delta Y$ based on the movement amount indicated by the stick 16 on the touch panel 15, thereby accurately calculating the shift amounts $\Delta X$ and $\Delta Y$ by using a simple configuration.

In the present embodiment, the shift amount calculation section 212 calculates the shift amounts $\Delta X$ and $\Delta Y$ by using the touch panel 15. However, the shift amount calculation section 212 may calculate the shift amounts $\Delta X$ and $\Delta Y$ by using other operation input means (for example, a key, a button, a mouse, or the like). For example, when the shift amounts ΔX and ΔY are received as the number of times the key is pressed, the shift amount calculation section 212 may calculate the shift amounts ΔX and ΔY based on the number of times the key is pressed.

The difference data calculation section 214 (corresponding to difference data calculation means) is a functional section for calculating difference data representing a difference between the processed image obtained through the editing process being currently performed, and an image obtained by shifting, by the shift amounts ΔX and ΔY calculated by the shift amount calculation section 212, the unprocessed image (=an image obtained through the editing process immediately preceding the editing process being currently performed) displayed on the second LCD 12 by the unprocessed image display section 211.

In the present embodiment, each of an initial image, and a still image obtained through each editing process, which are stored in the image storage section 243, is associated with one of white color and black color in units of pixels. The difference data calculation section 214 obtains, for each pixel, an exclusive OR (hereinafter, referred to as "EXOR") of the processed image obtained through the editing process being currently performed, and an image obtained by shifting the unprocessed image which is an image obtained through the editing process immediately preceding the editing process being currently performed, by the shift amounts ΔX and ΔY calculated by the shift amount calculation section 212, so as to calculate the difference data.

As described above, an EXOR of the processed image and an image obtained by shifting the unprocessed image by the shift amounts ΔX and ΔY calculated by the shift amount calculation section 212 is obtained for each pixel, so as to calculate the difference data. Therefore, the difference data can be obtained in a simple process.

Figure 5:
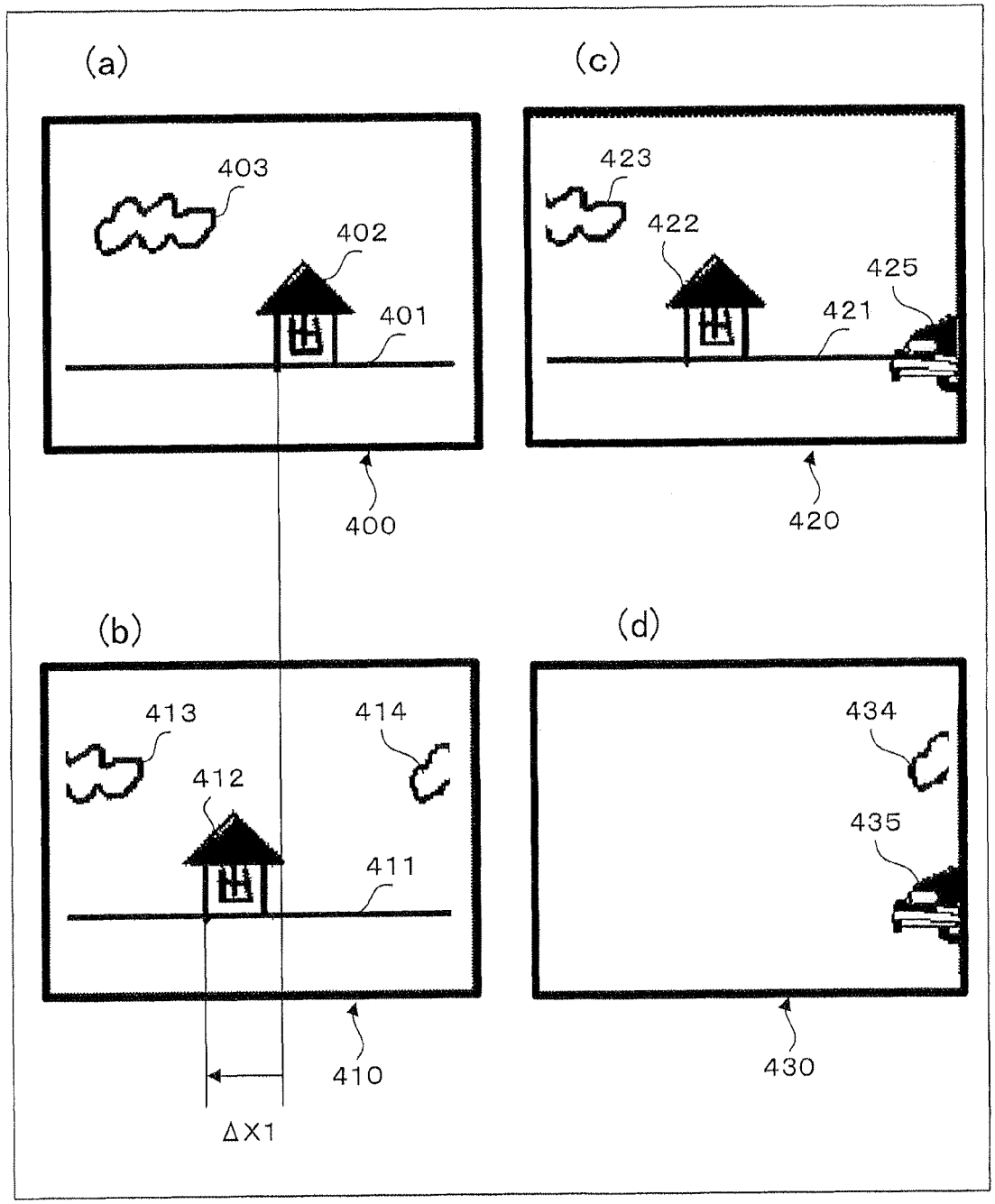
FIG. 5 is a diagram illustrating screens on which exemplary images generated by the moving image generation apparatus shown in FIG. 4 are displayed.

FIG. 5 is a diagram illustrating screens on which exemplary images generated by the moving image generation apparatus shown in FIG. 4 are displayed. Illustration (a) of FIG. 5 is a diagram illustrating a screen on which an exemplary unprocessed image 400 corresponding to an image generated through the editing process immediately preceding the editing process being currently performed is displayed. Illustration (b) of FIG. 5 is a diagram illustrating a screen on which an exemplary shifted image 410 corresponding to an image obtained through the shifting process being currently performed is displayed. Illustration (c) of FIG. 5 is a diagram illustrating a screen on which an exemplary processed image 420 obtained through the editing process being currently performed is displayed. Illustration (d) of FIG. 5 is a diagram illustrating a screen on which an exemplary difference image 430 representing a difference between the shifted image 410 and the processed image 420 is displayed.

As shown in illustration (a) of FIG. 5, the unprocessed image 400 includes a ground image 401, a house image 402, and a cloud image 403. As shown in illustration (b) of FIG. 5, the shifted image 410 is an image obtained by shifting the unprocessed image 400 leftward by the shift amount ΔX1. In this shifting process, the "spherical scrolling" as described above is performed. Consequently, the shifted image 410 includes a cloud image 414 in addition to a ground image 411, a house image 412, and a cloud image 413.

As shown in illustration (c) of FIG. 5, the processed image 420 includes a car image 425 in addition to a ground image 421, a house image 422, and a cloud image 423. Specifically, the editing execution section 213 deletes the cloud image 414 from the shifted image 410 shown in illustration (b) of FIG. 5, and renders the car image 425 representing a part of a car. The difference image 430 shown in illustration (d) of FIG. 5 includes a cloud image 434 corresponding to the cloud image 414 of the shifted image 410, and a car image 435 corresponding to the car image 425 of the processed image 420. The difference image 430 shown in illustration (d) of FIG. 5 is an image represented by the difference data which is obtained by obtaining, for each pixel, an EXOR of the shifted image 410 shown in illustration (b) of FIG. 5, and the processed image 420 shown in illustration (c) of FIG. 5 by means of the difference data calculation section 214.

The coding section 215 (corresponding to coding means) is a functional section for coding the difference data obtained by the difference data calculation section 214. Specifically, the coding section 215 codes the difference data through run length encoding.

The image addition section 216 (corresponding to image addition means) is a functional section for storing, in the image storage section 243, the shift amounts ΔX and ΔY calculated by the shift amount calculation section 212 and the difference data obtained by the difference data calculation section 214 so as to be associated with each other. Further, the image addition section 216 stores, in the image storage section 243, the difference data coded by the coding section 215 (coded difference information). Further, the image addition section 216 stores, in the image storage section 243, the shift amounts ΔX and ΔY, and the difference data so as to be associated with the frame number information. As shown in FIG. 3B, the image information of each frame, which is stored in the image storage section 243, includes the frame number information 243a, the shift amount information 243b, and the coded difference information 243c.

As described above, the difference data which is coded by the coding section 215 is stored in the image storage section 243, so that the moving image information can be efficiently stored. Further, the difference data is coded through the run length encoding, thereby enabling the moving image information to be coded by using a simple configuration. In the present embodiment, the coding section 215 codes the difference data through the run length encoding. However, the coding section 215 may code the difference data by using another compression method (for example, differential compression or the like).

Further, the shift amounts ΔX and ΔY, and the difference data are stored in the image storage section 243 so as to be associated with the frame number information, thereby generating the moving image information which is easily reproducible. In the present embodiment, the image addition section 216 stores the shift amounts ΔX and ΔY, and the difference data so as to be associated with the frame number information. However, the image addition section 216 may store, in the image storage section 243, the shift amounts ΔX and ΔY, and the difference data in the order in which the shift amounts ΔX and ΔY, and the difference data are generated, and the moving image information may be reproduced based on addresses at which the shift amounts ΔX and ΔY and the difference data are stored.

Figure 6:
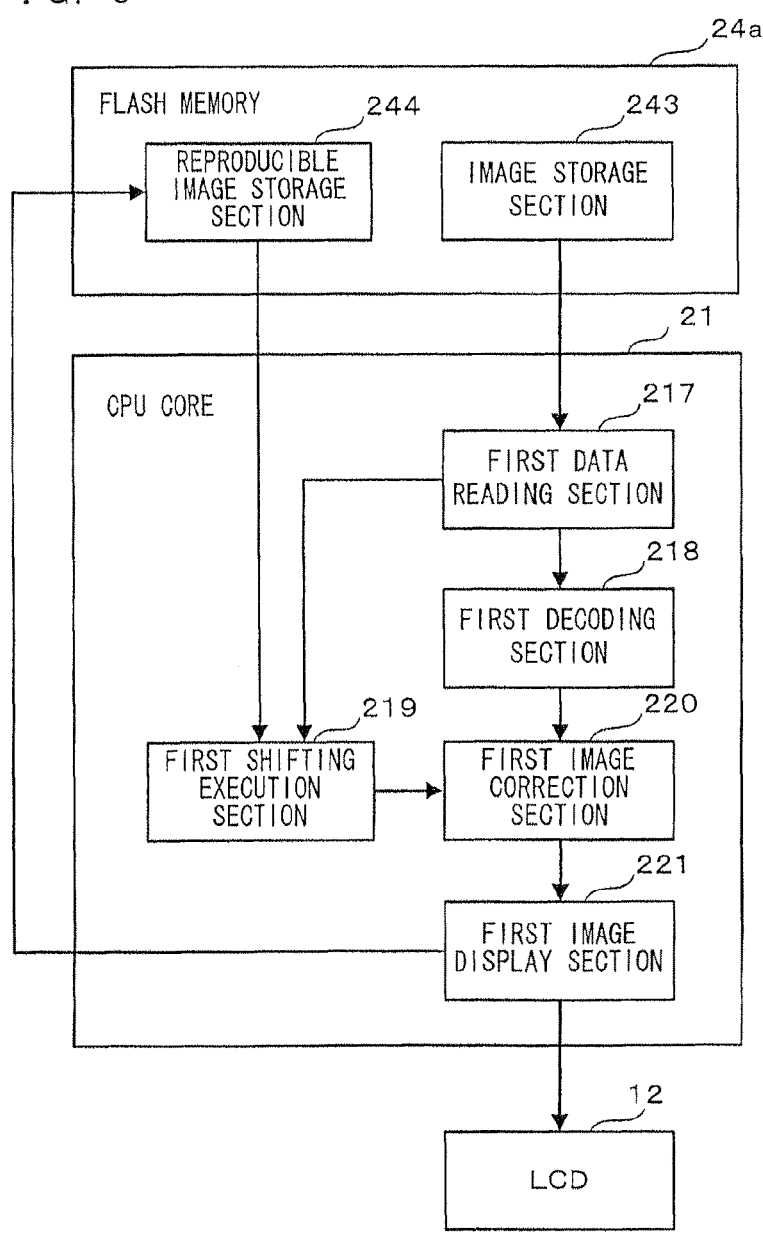
FIG. 6 is a block diagram illustrating an exemplary functional structure of a moving image reproduction apparatus which performs reproduction in the forward direction according to the present invention.

FIG. 6 is a block diagram illustrating an exemplary functional structure of a moving image reproduction apparatus which performs reproduction in the forward direction according to the present invention. The CPU core 21 (corresponding to a part of the moving image reproduction apparatus) functionally includes a first data reading section 217, a first decoding section 218, a first shifting execution section 219, a first image correction section 220, and a first image display section 221. The flash memory 24a (corresponding to a part of the moving image reproduction apparatus) functionally includes the image storage section 243 and the reproducible image storage section 244.

When the CPU core 21 executes the moving image reproduction program 241 (see FIG. 3) which is previously stored in the flash memory 24a or the like, the CPU core 21 functions as functional sections such as the first data reading section 217, the first decoding section 218, the first shifting execution section 219, the first image correction section 220, and the first image display section 221, and causes the flash memory 24a to function as functional sections such as the image storage section 243, and the reproducible image storage section 244.

The image storage section 243 (corresponding to image storage means) is a functional section for storing the moving image information generated by the moving image generation apparatus shown in FIG. 4. The reproducible image storage section 244 is a functional section for storing image information (=the image information of preceding frames) displayed by the first image display section 221.

The first data reading section 217 (corresponding to first data reading means) is a functional section for reading, from the image storage section 243, the shift amounts ΔX and ΔY, and the difference data which correspond to one of predetermined reproduction times. When the reproduction is initially started, the shift amounts ΔX and ΔY, and the difference data which correspond to one of the predetermined reproduction times are the shift amounts ΔX and ΔY, and the difference data which correspond to the frame number information representing a minimum number (in this case, the frame number="2"). Further, when the stopped reproduction is resumed, the shift amounts ΔX and ΔY, and the difference data which correspond to one of the predetermined reproduction times are the shift amounts ΔX and ΔY, and the difference data which correspond to the frame number information representing a frame number immediately following a frame number of a displayed image of which the reproduction is stopped.

The first decoding section 218 is a functional section for decoding the coded difference data which is read by the first data reading section 217.

The first shifting execution section 219 (corresponding to the first shifting execution means) is a functional section for shifting an image (=an image of a frame immediately preceding a frame of the one of the predetermined reproduction times) displayed immediately before the one of the predetermined reproduction times, by the shift amounts ΔX and ΔY read by the first data reading section 217. The first shifting execution section 219 performs the so-called "spherical scrolling" in the shifting process (see FIG. 7), as the editing execution section 213 shown in FIG. 4 does.

The first image correction section 220 (corresponding to first image correction means) is a functional section for correcting an image shifted by the first shifting execution section 219, by using the difference data which is read by the first data reading section 217 and decoded by the first decoding section 218, so as to obtain an image corresponding to an immediately following frame number. Specifically, the first image correction section 220 obtains, for each pixel, an EXOR of the shifted image which is an image shifted by the first shifting execution section 219, and the difference image which is an image represented by the difference data decoded by the first decoding section 218, so as to perform correction of the shifted image.

The first image display section 221 (corresponding to unprocessed image display means, first image display means) is a functional section for displaying, on the second LCD 12, an image (=an image corresponding to the immediately following frame number) which is obtained through the correction made by the first image correction section 220, so as to be visible from the outside. Further, the first image display section 221 stores, in the reproducible image storage section 244, the image information (=image information of the immediately following frame) which is obtained through the correction made by the first image correction section 220.

As described above, an image (=an image of an immediately preceding frame) displayed immediately before one of the predetermined reproduction times is shifted by the first shifting execution section 219, and the shifted image is corrected by using the difference data which is read by the first data reading section 217, and is decoded by the first decoding section 218, so as to reproduce the image information corresponding to an immediately following frame number, thereby reproducing a moving image in the forward direction by using a simple configuration.

Figure 7:
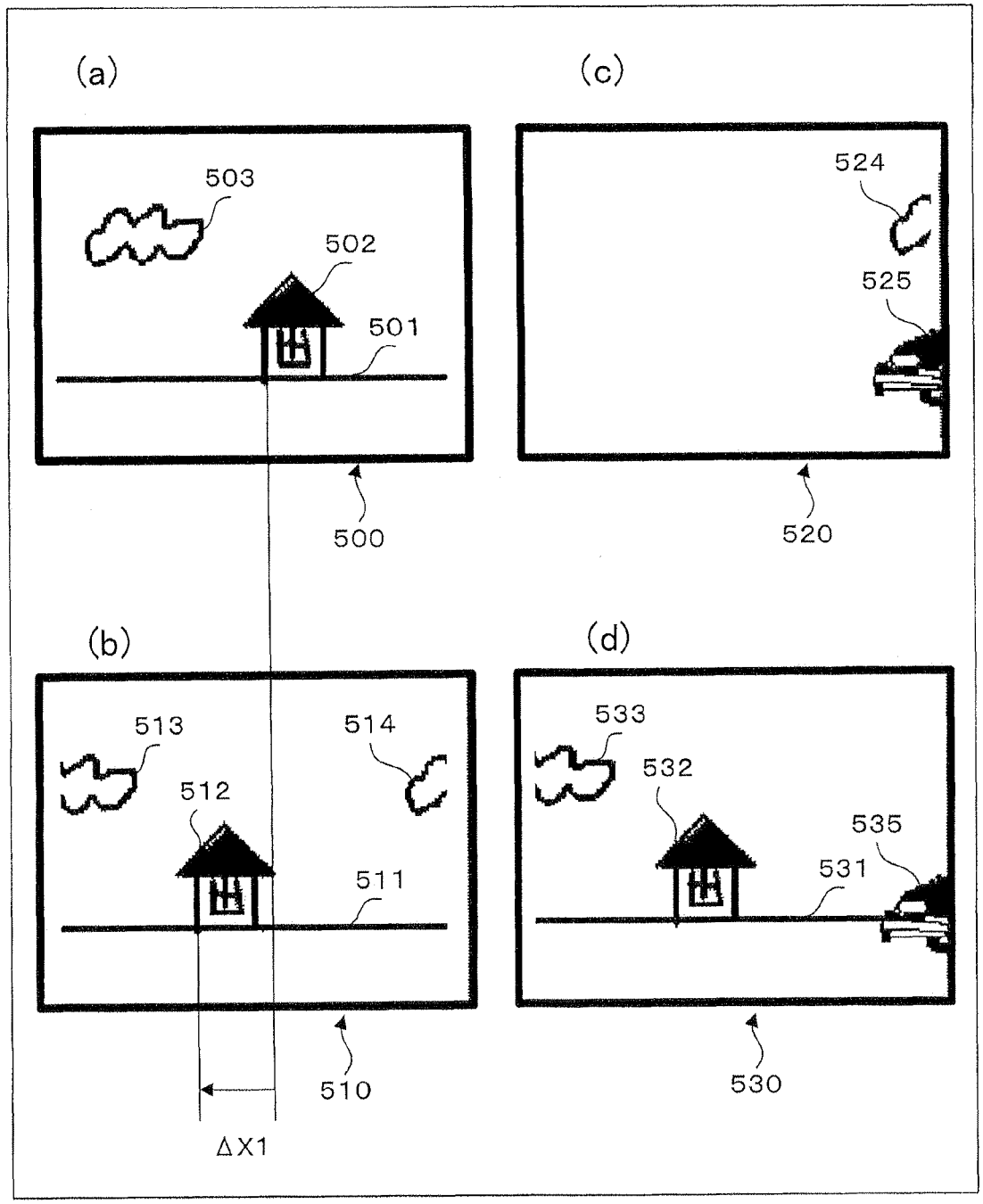
FIG. 7 is a diagram illustrating screens on which exemplary images obtained by the moving image reproduction apparatus shown in FIG. 6 are displayed.

FIG. 7 is a diagram illustrating screens on which exemplary images obtained by the moving image reproduction apparatus shown in FIG. 6 are displayed. Illustration (a) of FIG. 7 is a diagram illustrating a screen on which an exemplary unprocessed image 500 which is an image of the immediately preceding frame is displayed. Illustration (b) of FIG. 7 is a diagram illustrating a screen on which an exemplary shifted image 510 which is an image obtained by shifting the unprocessed image 500 is displayed. Illustration (c) of FIG. 7 is a diagram illustrating a screen on which an exemplary difference image 520 which is an image represented by the difference data is displayed. Illustration (d) of FIG. 7 is a diagram illustrating a screen on which an exemplary processed image 530 which is an image of the immediately following frame is displayed.

As shown in illustration (a) of FIG. 7, the unprocessed image 500 includes a ground image 501, a house image 502, and a cloud image 503. As shown in illustration (b) of FIG. 7, the shifted image 510 is an image obtained by shifting, by means of the first shifting execution section 219, the unprocessed image 500 leftward by the shift amount ΔX1 read from the image storage section 243. The "spherical scrolling" is performed in the shifting process as described above. The shifted image 510 includes a cloud image 514 in addition to a ground image 511, a house image 512, and a cloud image 513.

As shown in illustration (c) of FIG. 7, the difference image 520 includes a cloud image 524 and a car image 525. The processed image 530, shown in illustration (d) of FIG. 7, which is obtained by obtaining, for each pixel, an EXOR of the shifted image 510 shown in FIG. 7(*b*), and the difference image 520 shown in illustration (c) of FIG. 7, includes a car image 535, in addition to a ground image 531, a house image 532, and a cloud image 533. Thus, the processed image 530 which is the same as the processed image 420 shown in illustration (c) of FIG. 5 is obtained, through the reproduction, based on the unprocessed image 500, and the shift amount ΔX1 and the difference data (corresponding to the difference image 520 shown in illustration (c) of FIG. 7) which are stored in the image storage section 243.

Figure 8:
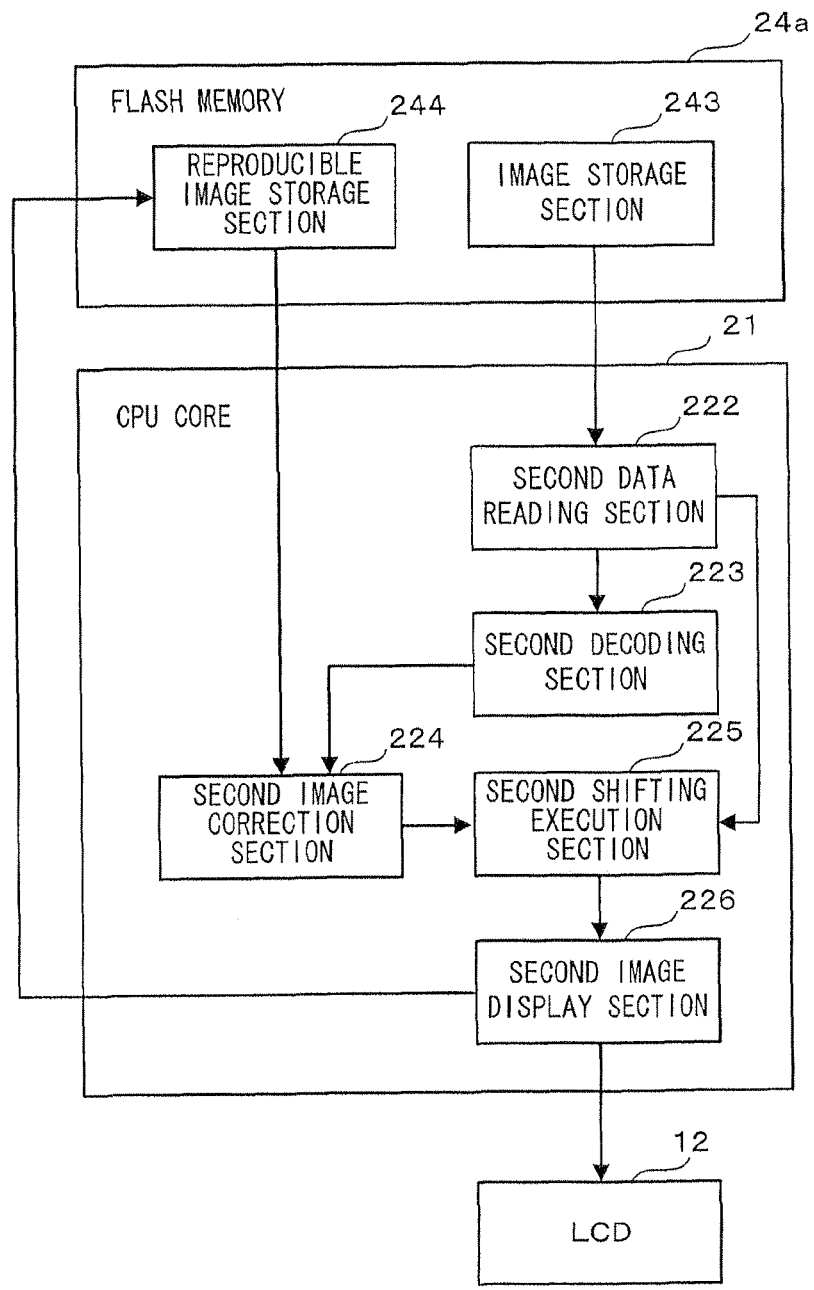
FIG. 8 is a block diagram illustrating an exemplary functional structure of a moving image reproduction apparatus which performs reproduction in the reverse direction according to the present invention.

FIG. 8 is a block diagram illustrating an exemplary functional structure of the moving image reproduction apparatus which performs reproduction in the reverse direction according to the present invention. The CPU core 21 (corresponding to a part of the moving image reproduction apparatus) functionally includes a second data reading section 222, a second decoding section 223, a second image correction section 224, a second shifting execution section 225, and a second image display section 226. The flash memory 24a (corresponding to a part of the moving image reproduction apparatus) functionally includes the image storage section 243, and the reproducible image storage section 244.

When the CPU core 21 executes the moving image reproduction program 241 (see FIG. 3) which is previously stored in the flash memory 24$a$, or the like, the CPU core 21 functions as functional sections such as the second data reading section 222, the second decoding section 223, the second image correction section 224, the second shifting execution section 225, and the second image display section 226, and causes the flash memory 24$a$ to function as functional sections such as the image storage section 243, and the reproducible image storage section 244.

The image storage section 243 (corresponding to image storage means) is a functional section for storing moving image information generated by the moving image generation apparatus shown in FIG. 4. The reproducible image storage section 244 is a functional section for storing the image information (=the image information of the immediately following frame) displayed by the second image display section 226.

The second data reading section 222 (corresponding to second data reading means) is a functional section for reading, from the image storage section 243, the shift amounts $\Delta X$ and $\Delta Y$, and the difference data corresponding to one of predetermined reproduction times. When reproduction is performed in the reverse direction after pause, the shift amounts $\Delta X$ and $\Delta Y$, and the difference data corresponding to one of the predetermined reproduction times are the shift amounts $\Delta X$ and $\Delta Y$, and the difference data corresponding to a frame number immediately preceding a frame number of a displayed image for which the pause is performed.

The second decoding section 223 is a functional section for decoding the difference data read by the second data reading section 222.

The second image correction section 224 (corresponding to second image correction means) is a functional section for correcting an image (=an image of a frame immediately following a frame of the one of the predetermined reproduction times) displayed immediately before the one of the predetermined reproduction times, by using the difference data which is read by the second data reading section 222, and is decoded by the second decoding section 223. Specifically, the second image correction section 224 obtains, for each pixel, an EXOR of the processed image which is an image stored in the reproducible image storage section 244, and the difference image which is an image represented by the difference data decoded by the second decoding section 223, so as to correct an image of the immediately following frame.

The second shifting execution section 225 (corresponding to second shifting execution means) is a functional section for shifting an image obtained through the correction made by the second image correction section 224, by the shift amounts obtained by reversing symbols of the shift amounts $\Delta X$ and $\Delta Y$ read by the second data reading section 222, so as to obtain an image of the immediately preceding frame. The second shifting execution section 225 performs the so-called "spherical scrolling" in the shifting process (see FIG. 9), as the editing execution section 213 shown in FIG. 4 does.

The second image display section 226 (corresponding to second image display means) is a functional section for displaying, on the second LCD 12, an image (=an image of the immediately preceding frame) which is obtained by the shifting performed by the second shifting execution section 225 so as to be visible from the outside. Further, the second image display section 226 stores, in the reproducible image storage section 244, the image information (=the image information of the immediately preceding frame) which is obtained by the shifting performed by the second shifting execution section 225.

As described above, an image (=an image of the immediately following frame) displayed immediately before one of the predetermined reproduction times is read by the second data reading section 222, and corrected by using the difference data decoded by the second decoding section 223, and the corrected image is shifted by the second shifting execution section 225, so as to obtain the image information of the immediately preceding frame, thereby reproducing the moving image in the reverse direction by using a simple configuration.

Figure 9:
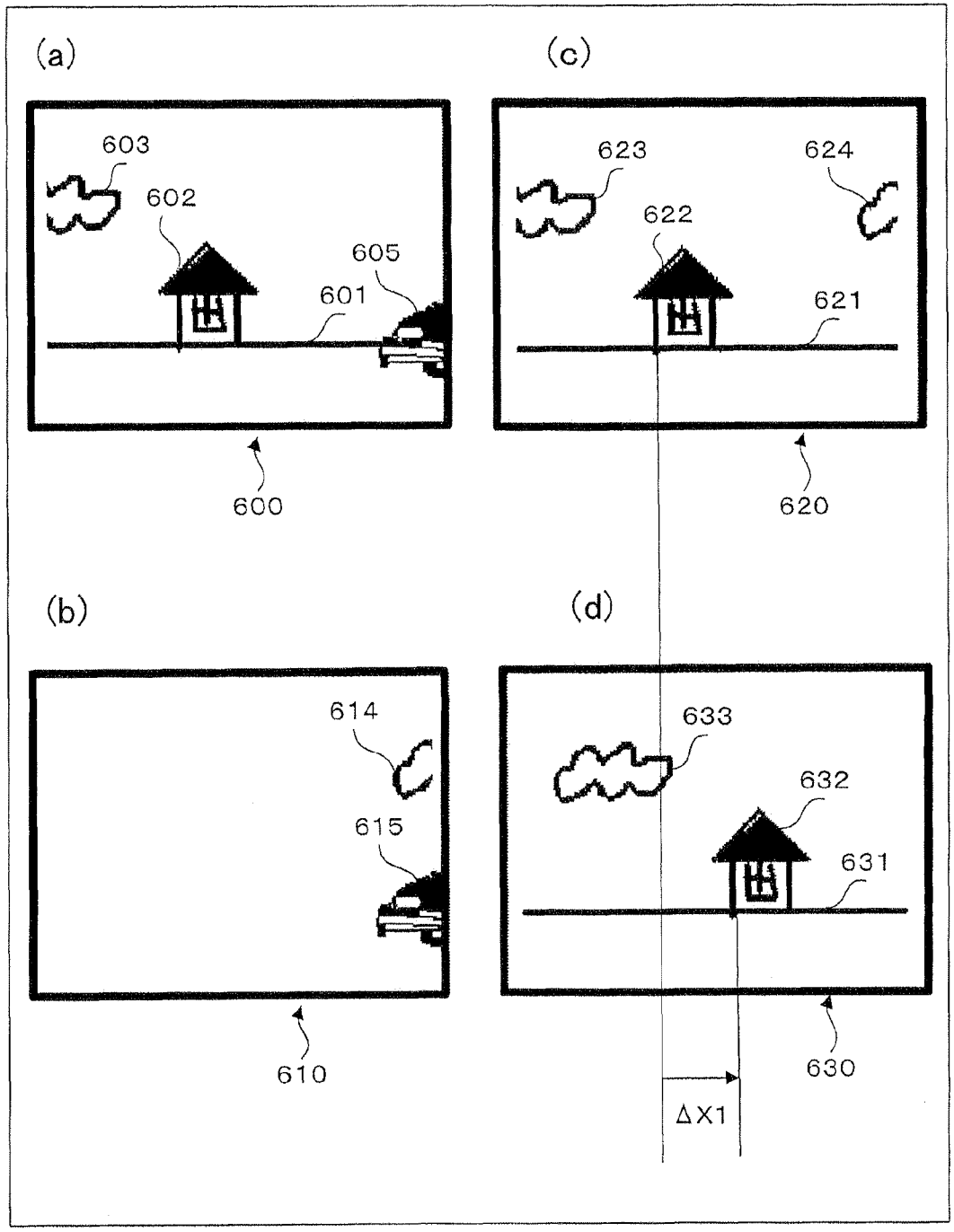
FIG. 9 is a diagram illustrating screens on which exemplary images obtained by the moving image reproduction apparatus shown in FIG. 8 are displayed.

FIG. 9 is a diagram illustrating screens on which exemplary images obtained by the moving image reproduction apparatus shown in FIG. 8 are displayed. Illustration (a) of FIG. 9 is a diagram illustrating a screen on which an exemplary processed image 600 which is an image of the immediately following frame is displayed. Illustration (b) of FIG. 9 is a diagram illustrating a screen on which an exemplary difference image 610 represented by the difference data is displayed. Illustration (c) of FIG. 9 is a diagram illustrating a screen on which an exemplary corrected image 620 obtained by correcting the processed image 600 by using the difference image 610 is displayed. Illustration (d) of FIG. 7 is a diagram illustrating a screen on which an exemplary unprocessed image 630 which is an image of the immediately preceding frame is displayed.

As shown in illustration (a) of FIG. 9, the processed image 600 includes a ground image 601, a house image 602, a cloud image 603, and a car image 605. As shown in illustration (b) of FIG. 9, the difference image 610 includes a cloud image 614 and a car image 615. As shown in illustration (c) of FIG. 9, the corrected image 620 includes a ground image 621, a house image 622, a cloud image 623, and a cloud image 624. That is, an EXOR of the processed image 600 and the difference image 610 is obtained for each pixel, so that the car image 605 is deleted from the processed image 600, and the cloud image 624 is added, thereby generating the corrected image 620.

The unprocessed image 630 is an image obtained by shifting, by means of the second shifting execution section 225, the corrected image 620, by a distance represented by an absolute value of the shift amount $\Delta X1$, in the right direction which is opposite to the direction (=the left direction) indicated by the shift amount $\Delta X1$ read from the image storage section 243. The "spherical scrolling" is performed in the shifting process as described above. The unprocessed image 630 includes a ground image 631, a house image 632, and a cloud image 633. As described above, the unprocessed image 630 which is the same as the unprocessed image 400 shown in illustration (a) of FIG. 5 is obtained through the reproduction, based on the processed image 600, the shift amount $\Delta X1$ and the difference data (corresponding to the difference image 610 shown in illustration (b) of FIG. 9) which are stored in the image storage section 243.

Figure 10:
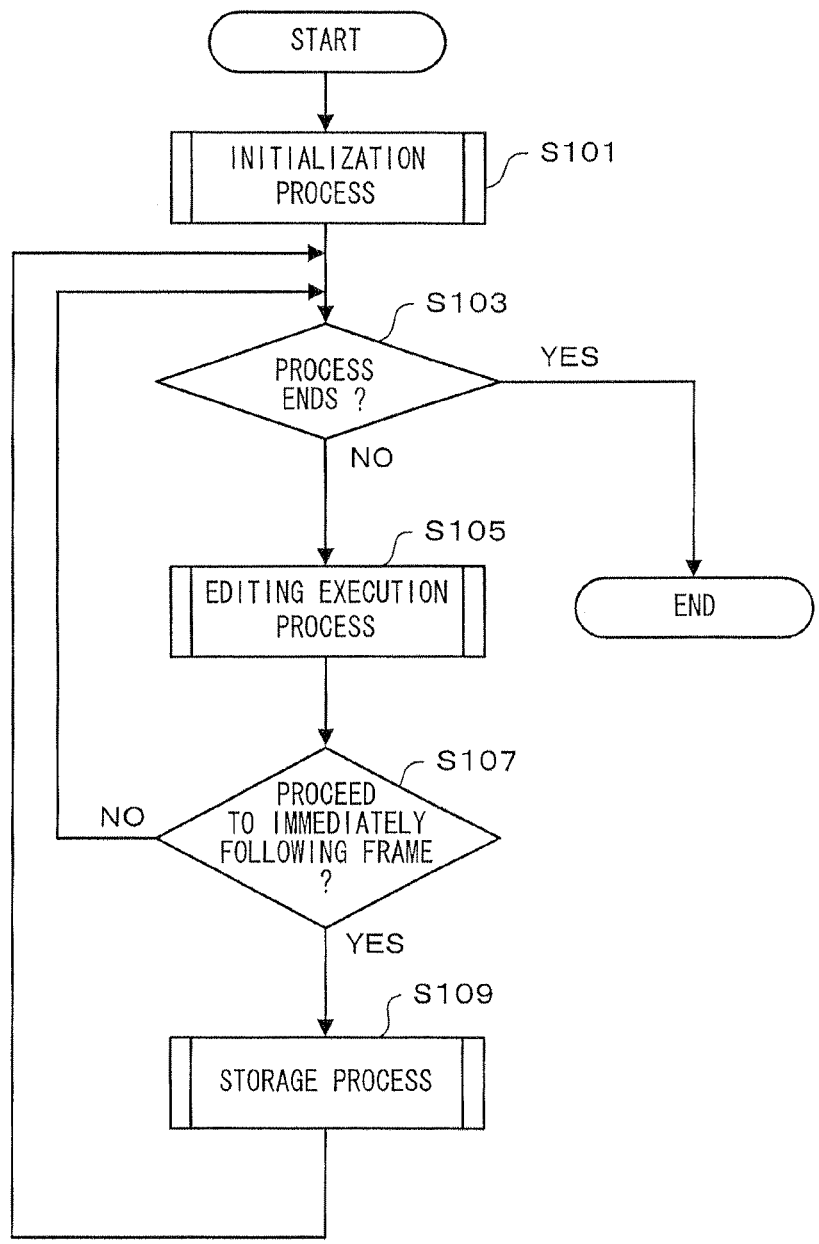
FIG. 10 is a flow chart showing an exemplary operation performed by the moving image generation apparatus shown in FIG. 4.

Next, an exemplary operation performed by the moving image generation apparatus shown in FIG. 4 will be described with reference to flow charts shown in FIG. 10 to FIG. 13. FIG. 10 is a flow chart showing an exemplary operation performed by the moving image generation apparatus shown in FIG. 4. Initially, in step S101, the unprocessed image display section 211 or the like performs initialization process for initializing values of a counter and the like, and the process is advanced to step S103. In a case where the process step of step S101 is ended, when the determination of step S107 indicates NO or when the process step of step S109 is ended, the editing execution section 213 receives an operation input from a user through the touch panel 15 or the like, and determines whether or not the moving image generation process is to be ended, based on the received operation input, in step S103. When the moving image generation process is determined to be ended (YES in S103), the process is ended. When it is determined that the moving image generation process is not to be ended (NO in step S103), the process is advanced to step S105.

In step S105, the editing execution section 213 or the like executes editing process for editing an image, and the process is advanced to step S107. In step S107, the editing execution section 213 receives an operation input from a user through the touch panel 15 or the like, and edits an image of a frame being currently processed, based on the received operation input, and determines whether or not an image of a frame immediately following the frame being currently processed is to be edited. When it is determined that the process is not performed for the immediately following frame (=that editing process for the image of the frame being currently processed is continued, or that the process is to be ended) (No in step S107), the process is returned to step S103, and the process steps of step S103 and the following steps are repeated.

When it is determined that the process is to be performed for the immediately following frame (YES in step S107), the image addition section 216 or the like performs storage process for storing the edited image and the like in the image storage section 243, and the process is returned to step S103, and the process steps of step S103 and the following steps are repeated.

Figure 11:
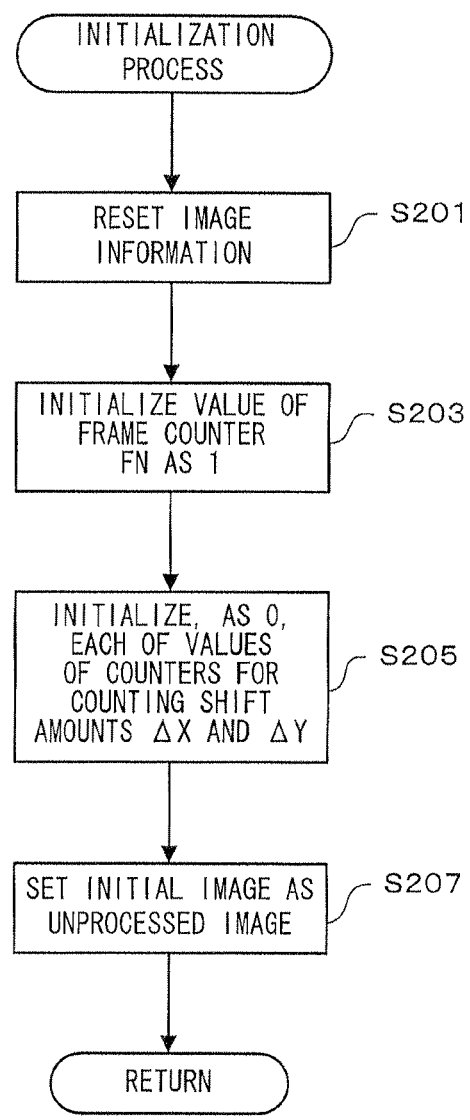
FIG. 11 is a flow chart showing in detail an exemplary initialization process of step S101 of the flow chart shown in FIG. 10.

FIG. 11 is a flow chart showing in detail an exemplary initialization process of step S101 of the flow chart shown in FIG. 10. Initially, in step S201, the image addition section 216 deletes the image information stored in the image storage section 243, and the process is advanced to step S203. In step S203, the image addition section 216 initialize, as "1", a value of a frame counter FN which is a counter for counting frame numbers, and the process is advanced to step S205.

In step S205, the shift amount calculation section 212 initializes, as "0", values of counters which count the shift amounts ΔX and ΔY, respectively, and the process is advanced to step S207. In step S207, the unprocessed image display section 211 sets an initial image which is previously stored in the flash memory 24a or the like, as the unprocessed image corresponding to a still image obtained through the preceding editing processes including the immediately preceding editing process, and the process is returned to step S103 shown in FIG. 10.

Figure 12:
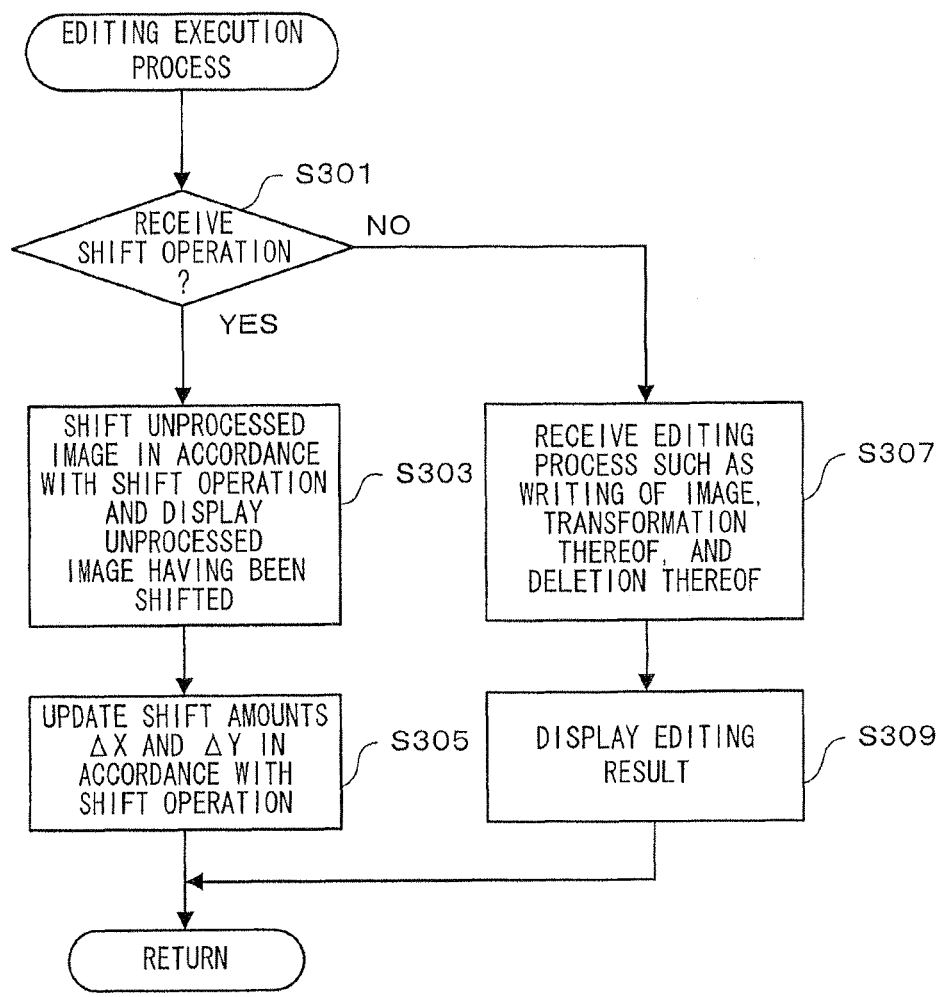
FIG. 12 is a flow chart showing in detail an exemplary editing execution process of step S105 of the flow chart shown in FIG. 10.

FIG. 12 is a flow chart showing in detail an exemplary editing execution process of step S105 of the flow chart shown in FIG. 10. Initially, in step S301, the editing execution section 213 determines whether or not a shift operation for shifting the unprocessed image is received through the touch panel 15. When the shift operation is determined as being received (YES in S301), the process is advanced to step S303. When it is determined that the shift operation is not received (NO in S301), the process is advanced to step S307.

In step S303, the editing execution section 213 shifts the unprocessed image in accordance with the shift operation received in step S301, and the shifted image is displayed on the second LCD 12, and the process is advanced to step S305. In step S305, the shift amount calculation section 212 updates values of the counters for counting the shift amounts ΔX and ΔY, respectively, in accordance with the shift operation received in step S301, and the process is returned to step S107 of FIG. 10.

In step S307, the editing execution section 213 receives editing processes, such as writing of an image, transformation thereof, and deletion thereof, other than the shifting process, and the process is advanced to step S309. In step S309, the editing execution section 213 subjects an image displayed on the second LCD 12, to the editing process received in step S307, and the result of the editing process is displayed on the second LCD 12, and the process is returned to step S107 of FIG. 10.

Figure 13:
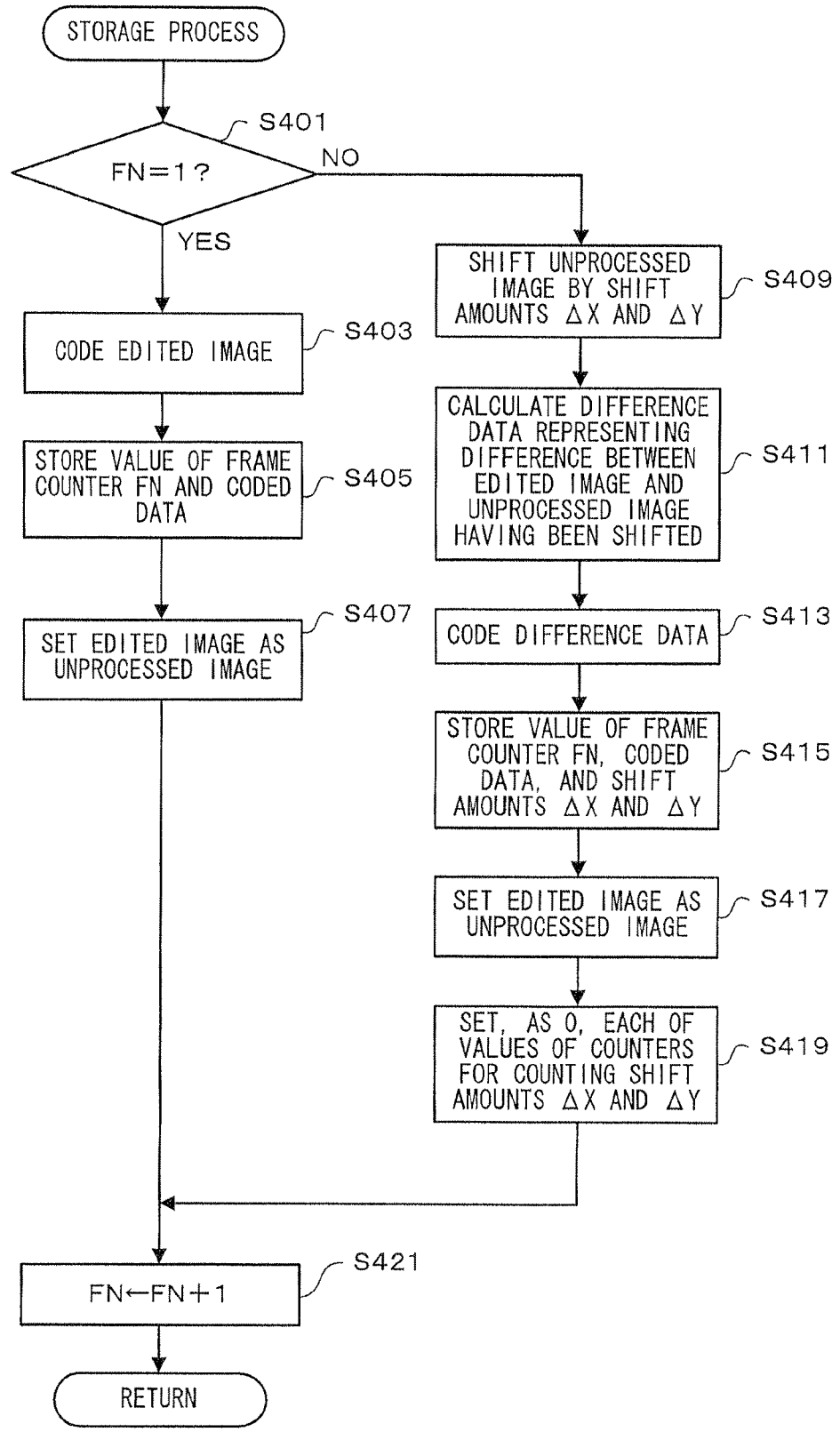
FIG. 13 is a flow chart showing in detail an exemplary storage process of step S109 of the flow chart shown in FIG. 10.

FIG. 13 is a flow chart showing in detail an exemplary storage process of step S109 of the flow chart shown in FIG. 10. Initially, in step S401, the image addition section 216 determines whether or not the value of the frame counter FN indicates "1". When the value of the frame counter FN is determined as indicating "1" (YES in S401), the process is advanced to step S403. When it is determined that the value of the frame counter FN does not indicate "1" (NO in S401), the process is advanced to step S409.

In step S403, the coding section 215 codes an edited image, and the process is advanced to step S405. In step S405, the image addition section 216 stores, in the image storage section 243, the value of the frame counter FN, and the image data which is obtained through the coding of step S403, and the process is advanced to step S407. In step S407, the unprocessed image display section 211 sets the edited image as the unprocessed image, and the process is advanced to step S421.

In step S409, the difference data calculation section 214 shifts the unprocessed image by values indicated by the counters for counting the shift amounts ΔX and ΔY, respectively, and the process is advanced to step S411. In step S411, the difference data calculation section 214 obtains the difference data representing a difference between the unprocessed image shifted in step S409, and the processed image which is an image obtained through the editing process been currently performed, and the process is advanced to step S413. In step S413, the coding section 215 codes the difference data obtained in step S411, and the process is advanced to step S415. In step S415, the image addition section 216 stores, in the image storage section 243, the difference data obtained through the coding of step S413, and the values of the counters for counting the shift amounts ΔX and ΔY, respectively, so as to be associated with a value of the frame counter FN, and the process is advanced to step S417.

In step S417, the unprocessed image display section 211 sets the edited image, as the unprocessed image, and displays the unprocessed image on the second LCD 12, and the process is advanced to step S419. In step S419, the shift amount calculation section 212 initializes, as "0", each of the values indicated by the counters for counting the shift amounts ΔX and ΔY, respectively, and the process is advanced to step S421. When the process step of step S407 is ended, or when the process step of step S419 is ended, the image addition section 216 increments the frame counter FN by "1" in step S421, and the process is returned to step S103 of FIG. 10.

As described above, the shift amount calculation section 212 is able to accurately obtain the shift amounts ΔX and ΔY for the left-right direction and for the upward-downward direction, respectively, in the shifting process, by using a simple configuration, thereby reducing processing load necessary for compressing the image information.

Figure 14:
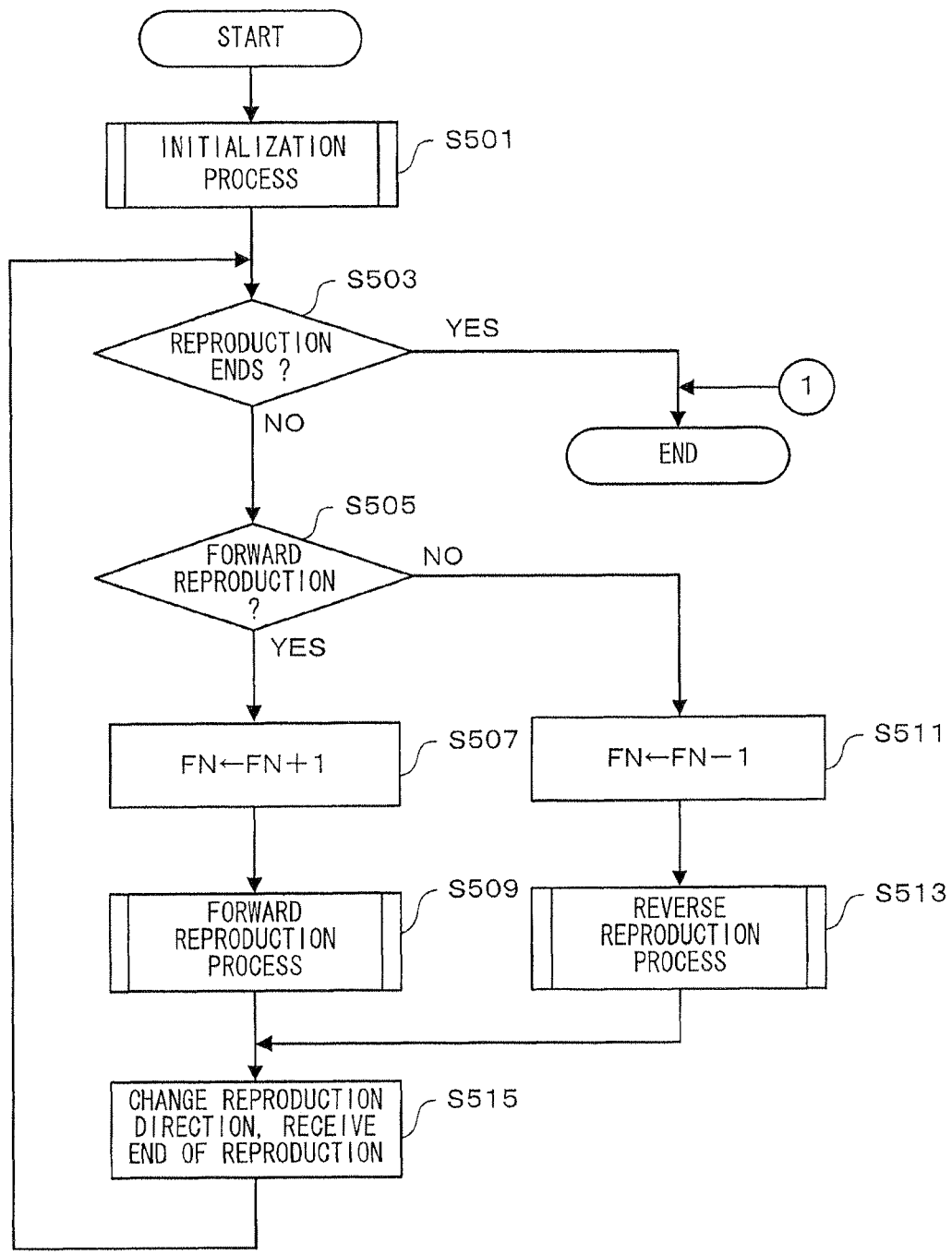
FIG. 14 is a flow chart showing an exemplary operation performed by the moving image reproduction apparatus shown in FIG. 8.

Next, exemplary operations performed by the moving image reproduction apparatuses shown in FIG. 6 and FIG. 8 will be described with reference to flow charts shown in FIG. 14 to FIG. 17. FIG. 14 is a flow chart showing exemplary operations performed by the moving image reproduction apparatuses shown in FIG. 6 and FIG. 8. For the convenience sake, a case where moving images which are previously generated by the moving image generation apparatus shown in FIG. 4 are stored in the image storage section 243 will be described. Initially, in step S501, the first data reading section 217 and the like perform initialization process for initializing values of the counter and the like, and the process is advanced to step S503. In a case where the process step of step S501 is ended, when the process step of step S515 is ended, the first data reading section 217 receives an operation input from a user through the touch panel 15 or the like, and whether or not the moving image reproduction process is to be ended is determined based on the received operation input, in step S503. When it is determined that the moving image reproduction process is to be ended (YES in S503), the process is ended. When it is determined that the moving image reproduction process is not to be ended (NO in S503), the process is advanced to step S505.

In step S505, the first data reading section 217 receives an operation input from a user through the touch panel 15 or the like, and whether the reproduction is to be performed in the forward direction or in the reverse direction is determined based on the received operation input. When it is determined that the reproduction is to be performed in the forward direction (YES in S505), the process is advanced to step S507. When it is determined that the reproduction is to be performed in the reverse direction (NO in S505), the process is advanced to step S511.

In step S507, the first data reading section 217 increments the frame counter FN by "1", and the process is advanced to step S509. In step S509, the first image display section 221 and the like perform forward reproduction process for performing reproduction in the forward direction, and the process is advanced to step S515.

In step S511, the second data reading section 222 decrements the frame counter FN by "1", and the process is advanced to step S513. In step S513, the second image display section 226 and the like perform the reverse reproduction process for performing reproduction in the reverse direction, and the process is advanced to step S515.

When the process step of step S509 is ended, or when the process step of step S513 is ended, the first data reading section 217 receives an operation input from a user through the touch panel 15 or the like, and is instructed to, for example, change reproduction direction, or end the reproduction, based on the received operation input, and the process is returned to step S503, and the process steps of step S503 and the following steps are repeated.

Figure 15:
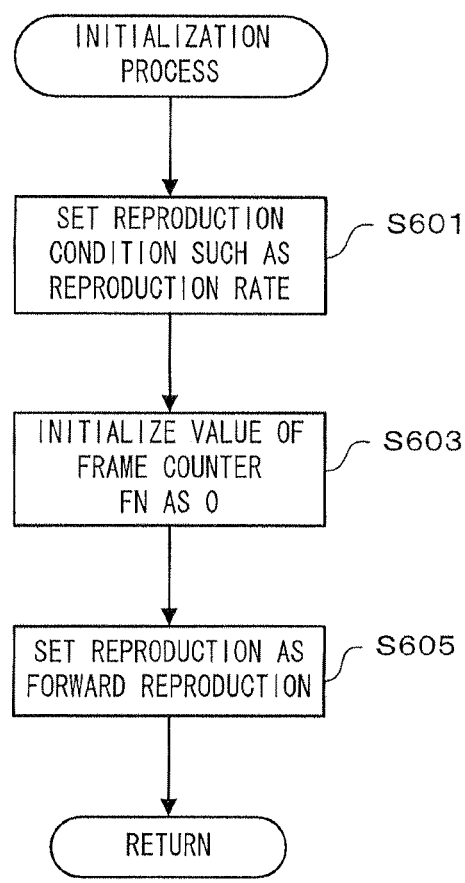
FIG. 15 is a flow chart showing in detail an exemplary initialization process of step S501 of the flow chart shown in FIG. 14.

FIG. 15 is a flow chart showing in detail an exemplary initialization process of step S501 of the flow chart shown in FIG. 14. Initially, in step S601, the first data reading section 217 receives an operation input from a user through the touch panel 15 or the like, and reproduction condition such as reproduction rate is set based on the received operation input, and the process is advanced to step S603. In step S603, the first data reading section 217 initializes, as "0", a value of the frame counter FN for counting the frame numbers, and the process is advanced to step S605. In step S605, the first data reading section 217 sets the forward direction as the reproduction direction, and the process is returned to step S503 of FIG. 14.

Figure 16:
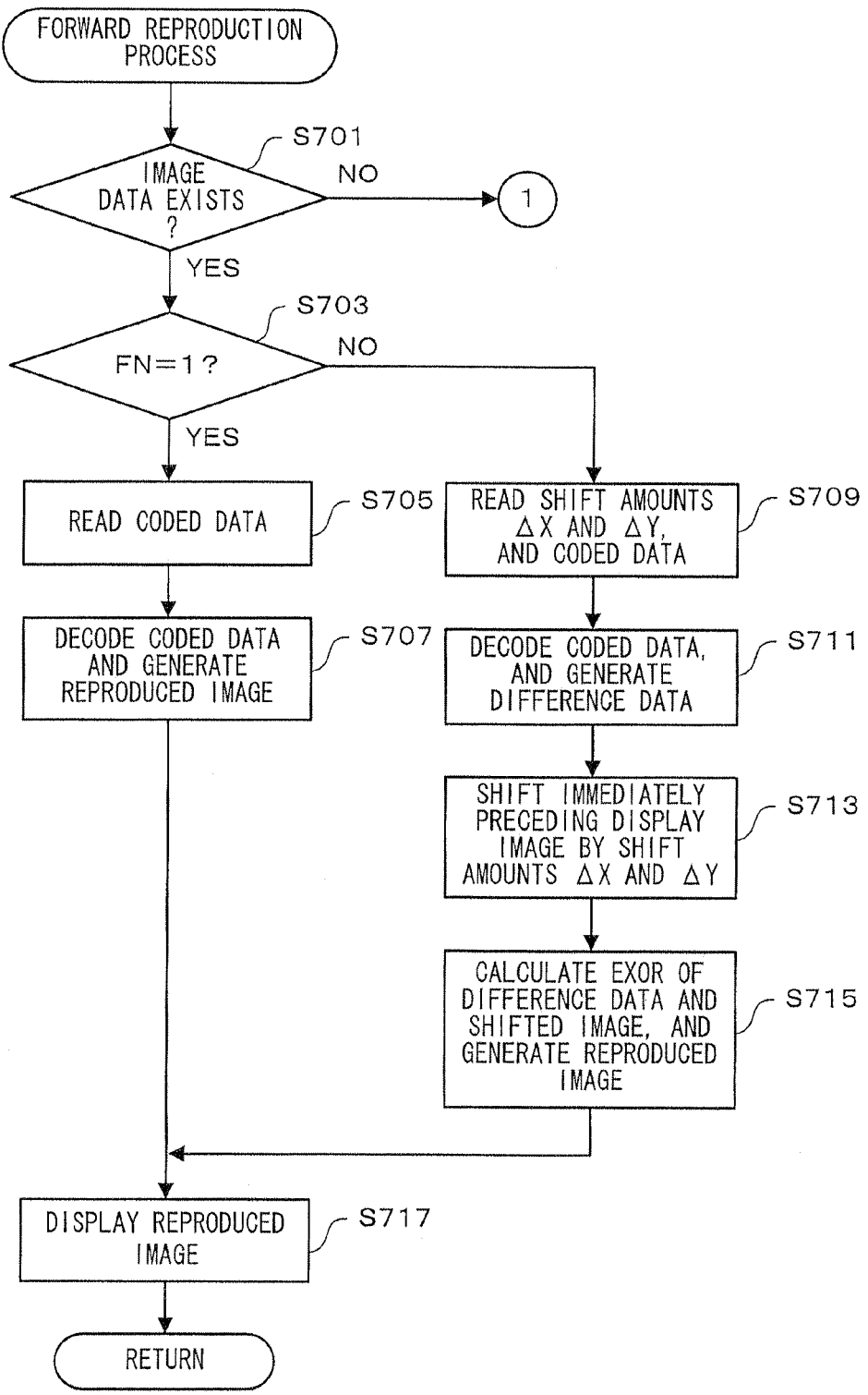
FIG. 16 is a flow chart showing in detail an exemplary forward reproduction process of step S509 of the flowchart shown in FIG. 14.

FIG. 16 is a flow chart showing in detail an exemplary forward reproduction process of step S509 of the flowchart shown in FIG. 14. Initially, in step S701, the first data reading section 217 determines whether or not the image data corresponding to the value of the frame counter FN is stored in the image storage section 243. When it is determined that the image data corresponding to the value of the frame counter FN is not stored in the image storage section 243 (NO in S701), the process is ended. When it is determined that the image data corresponding to the value of the frame counter FN is stored in the image storage section 243 (YES in S701), the process is advanced to step S703.

In step S703, the first data reading section 217 determines whether or not the value of the frame counter FN indicates "1". When the value of the frame counter FN is determined as indicating "1" (YES in S703), the process is advanced to step S705. When it is determined that the value of the frame counter FN does not indicate "1" (NO in S703), the process is advanced to step S709.

In step S705, the first data reading section 217 reads, from the image storage section 243, coded image information corresponding to the frame number "1", and the process is advanced to step S707. In step S707, the first decoding section 218 decodes the image information read in step S705, so as to generate a reproduced image, and the process is advanced to step S717.

In step S709, the first data reading section 217 reads, from the image storage section 243, the shift amounts ΔX and ΔY and the coded difference data, which correspond to the value of the frame counter FN, and the process is advanced to step S711. In step S711, the first decoding section 218 decodes the coded difference data which is read in step S709, and the process is advanced to step S713. In step S713, the first shifting execution section 219 reads the image information (=the image information of the immediately preceding frame) stored in the reproducible image storage section 244, and shifts the read image by the shift amounts ΔX and ΔY which are read in step S709, so as to generate a shifted image, and the process is advanced to step S715. In step S715, the first image correction section 220 obtains, for each pixel, an EXOR of the difference data decoded in step S711, and the shifted image generated in step S713, so as to generate a reproduced image, and the process is advanced to step S717.

In step S717, the first image display section 221 displays, on the second LCD 12, the reproduced image generated in step S707 or step S715, and the process is returned to step S515 of FIG. 14.

Figure 17:
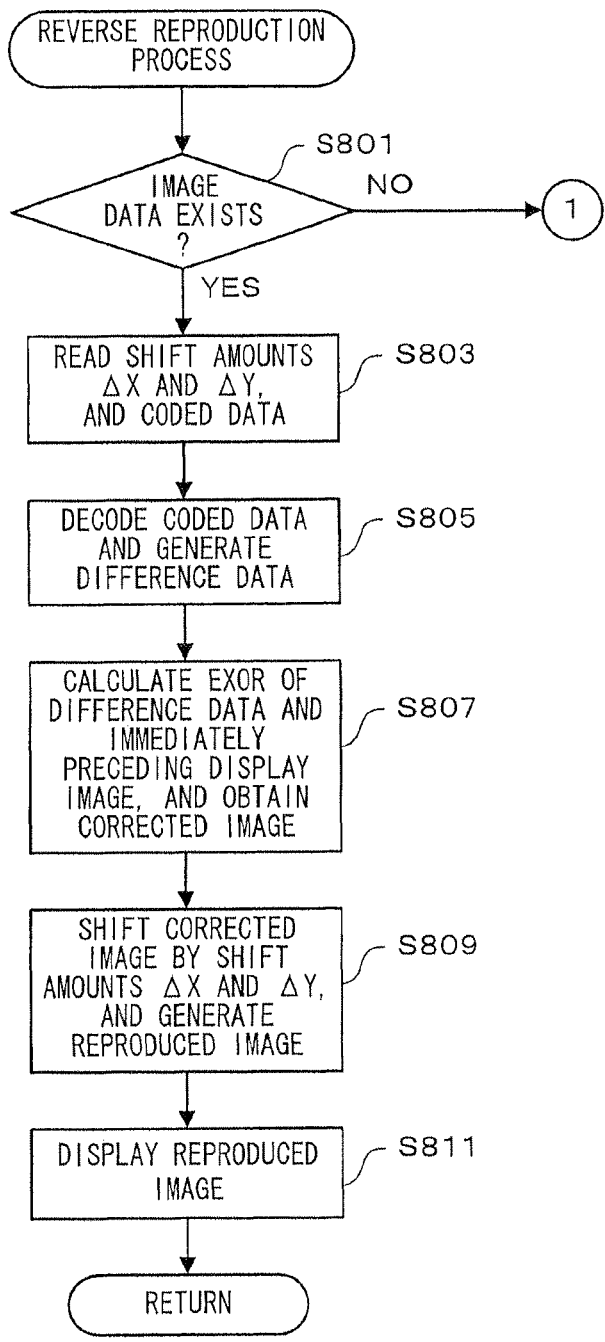
FIG. 17 is a flow chart showing in detail an exemplary reverse reproduction process of step S513 of the flowchart shown in FIG. 14.

FIG. 17 is a flow chart showing in detail an exemplary reverse reproduction process of step S513 of the flow chart shown in FIG. 14. Initially, in step S801, the second data reading section 222 determines whether or not the image data corresponding to the value of the frame counter FN is stored in the image storage section 243. When it is determined that the image data corresponding to the value of the frame counter FN is not stored in the image storage section 243 (NO in S801), the process is ended. When the image data corresponding to the value of the frame counter FN is determined as being stored in the image storage section 243 (YES in S801), the process is advanced to step S803.

In step S803, the second data reading section 222 reads, from the image storage section 243, the shift amounts ΔX and ΔY and the coded difference data, which correspond to the value of the frame counter FN, and the process is advanced to step S805. In step S805, the second decoding section 223 decodes the coded difference data which is read in step S803, and the process is advanced to step S807. In step S807, the second image correction section 224 reads the image information (=the image information of the immediately following frame) stored in the reproducible image storage section 244, and obtains, for each pixel, an EXOR of the read image information, and the difference data which is decoded in step S805, so as to obtain a corrected image, and the process is advanced to step S809. In step S809, the second shifting execution section 225 shifts the corrected image which is generated in step S807, by a shift amount obtained by reversing symbols of the shift amounts ΔX and ΔY read in step S803 so as to generate a reproduced image, and the process is advanced to step S811. In step S811, the second image display section 226 displays, on the second LCD 12, the reproduced image which is generated in step S809, and the process is returned to step S515 of FIG. 14.

As described above, the moving image generated by the moving image generation apparatus shown in FIG. 4 is stored in the image storage section 243, so that the moving image can be reproduced in the forward direction and the reverse direction by using a simple configuration.

The moving image generation apparatus and the moving image reproduction apparatus according to the present invention may not necessarily use the CPU core 21 and the flash memory 24a which are described in the embodiment described above. The CPU core 21 and the flash memory 24a may be configured as described below.

(A) In the present embodiment, the moving image generation apparatus is configured such that the CPU core 21 functionally includes the unprocessed image display section 211, the shift amount calculation section 212, the editing execution section 213, the difference data calculation section 214, the coding section 215, the image addition section 216, and the like. However, at least one of the functional sections corresponding to the unprocessed image display section 211, the shift amount calculation section 212, the editing execution section 213, the difference data calculation section 214, the coding section 215, and the image addition section 216, may be formed by hardware such as an electrical circuit.

(B) In the present embodiment, the moving image reproduction apparatus is configured such that the CPU core 21 functionally includes the first data reading section 217, the first decoding section 218, the first shifting execution section 219, the first image correction section 220, the first image display section 221, and the like. However, at least one of the functional sections corresponding to the first data reading section 217, the first decoding section 218, the first shifting execution section 219, the first image correction section 220, and the first image display section 221 may be formed by hardware such as an electrical circuit.

(C) In the present embodiment, the moving image reproduction apparatus is configured such that the CPU core 21 functionally includes the second data reading section 222, the second decoding section 223, the second image correction section 224, the second shifting execution section 225, the second image display section 226, and the like. However, at least one of the functional sections corresponding to the second data reading section 222, the second decoding section 223, the second image correction section 224, the second shifting execution section 225, and the second image display section 226 may be formed by hardware such as an electrical circuit.

(D) In the present embodiment, the moving image generation apparatus and the moving image reproduction apparatus are provided in the game apparatus 10. However, at least one of the moving image generation apparatus and the moving image reproduction apparatus may be provided in another type of information processing apparatus. For example, the moving image generation apparatus and the moving image reproduction apparatus may be provided in a personal computer, a PDA (Personal Digital Assistant), a mobile telephone, or the like.

(E) In the present embodiment, still images forming a moving image are each associated with one of white color or black color for each pixel. However, still images forming a moving image may be each associated with any one of predetermined two colors (for example, red color, blue color), for each pixel. Also in this case, an EXOR may be obtained for, for example, calculating the difference data, as in the present embodiment. Further, each of still images forming a moving image may be a black-and-white image including gray color, or may be a color image.

(F) In the present embodiment, the moving image generation apparatus receives a series of editing process, so as to generate the moving image information. However, the moving image generation apparatus may read moving image information which has been generated in previous sessions, and generate moving image information following the read moving image information. In this case, the moving image generation apparatus needs to include a functional section (corresponding to unprocessed image generation means) for generating, by using initial image information, the shift amounts, and the difference data which are stored in the image storage section 243 shown in FIG. 4, a still image based on the editing processes which have been performed and include the immediately preceding editing process. In this case, the stopped editing process can be easily restarted and continued (or a moving image following a moving image having been previously generated can be easily generated), thereby improving convenience.

The present invention is applicable to, for example, a moving image generation program and a moving image generation apparatus for generating moving image information. In particular, the present invention is applicable to a moving image generation program executed by an information processing apparatus which performs an editing process, based on a predetermined operation input, for editing an initial image displayed by a display device, generates still image information through the editing process, and stores the still image information as moving image information, and to a moving image generation apparatus. Further, the present invention is applicable to, for example, a moving image reproduction program and a moving image reproduction apparatus which reproduce moving image information. In particular, the present invention is applicable to a moving image reproduction program executed by an information processing apparatus for reproducing, in a forward direction, moving image information which is generated by using: an initial image which is initially displayed; a shift amount representing an amount of a shift between display images of predetermined frames; and difference data representing a difference between an image obtained by shifting, by the shift amount, a display image of a preceding one of the predetermined frames, and a display image of a following one of the predetermined frames, and for displaying, by means of a display device, the moving image information having been reproduced, the initial image, the shift amount, and the difference data being stored in image storage means, and is applicable to a moving image reproduction apparatus.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein a moving image reproduction program executed by an information processing apparatus for reproducing, in a forward direction, moving image information which is generated by using: an initial image which is initially displayed; a shift amount representing an amount of a shift between display images of predetermined frames; and difference data representing a difference between an image obtained by shifting, by the shift amount, a display image of a preceding one of the predetermined frames, and a display image of a following one of the predetermined frames, and for displaying, via a display device, the moving image information having been reproduced, the initial image, the shift amount, and the difference data being stored in an image storage unit, the moving image reproduction program causing a computer of the information processing apparatus being caused to execute functions comprising:

displaying the initial image as an unprocessed image using the display device;
reading, from the image storage unit, the shift amount and the difference data corresponding to a reproduction time which immediately follows a reproduction time at which the unprocessed image is reproduced;
shifting the unprocessed image displayed using the display device, by the read shift amount;
correcting an image obtained by shifting the unprocessed image, by using the read difference data; and
displaying, via the display device, the corrected image.

2. The non-transitory computer-readable storage medium according to claim 1,
wherein the computer is configured to execute the functions of the moving image reproduction program in a repetitive manner, and
wherein the corrected image is used as the unprocessed image which is to be displayed for an immediately following time.

3. The non-transitory computer-readable storage medium according to claim 1,
wherein each of the initial image, the unprocessed image, and the corrected image is associated with one of predetermined two colors in units of pixels, and
wherein the correction is made by obtaining, in units of pixels, an exclusive OR of the difference data and the image obtained through the performed shifting.

4. The non-transitory computer-readable storage medium according to claim 1,
wherein the difference data having been coded is stored in the image storage unit,
wherein the computer is caused to further execute decoding the read difference data having been coded, and
wherein the correction is made by using the decoded difference data.

5. The non-transitory computer-readable storage medium according to claim 4, wherein the difference data is coded through a run length encoding, and stored in the image storage unit.

6. The non-transitory computer-readable storage medium according to claim 1, wherein the image storage unit stores the initial image, the shift amount, and the difference data so as to be associated with frame number information.

7. The non-transitory computer-readable storage medium according to claim 1,
wherein the computer is caused to further execute:
reading, from the image storage unit, the shift amount and the difference data corresponding to a predetermined reproduction time;
correcting an image displayed by the display device at the predetermined reproduction time, by using the read difference data;
shifting the corrected image by a shift amount which is obtained by reversing a symbol of the read shift amount; and
displaying, via the display device, the shifted image.

8. A moving image reproduction apparatus for reproducing, in a forward direction, moving image information which is generated by using: an initial image which is initially displayed; a shift amount representing an amount of a shift between display images of predetermined frames; and difference data representing a difference between an image obtained by shifting, by the shift amount, a display image of a preceding one of the predetermined frames, and a display image of a following one of the predetermined frames, and for displaying, via a display device, the moving image information having been reproduced, the initial image, the shift amount, and the difference data being stored in an image storage unit, the moving image reproduction apparatus comprising:

an unprocessed image display unit for displaying the initial image as an unprocessed image by means of the display device;
a first data reading unit for reading, from the image storage unit, the shift amount and the difference data corresponding to a reproduction time which immediately follows a reproduction time at which the unprocessed image is reproduced;
a first shifting execution unit for shifting the unprocessed image displayed via the display device, by the shift amount read by the first data reading unit;
a first image correction unit for correcting an image obtained by shifting the unprocessed image via the first shifting execution unit, by using the difference data read by the first data reading unit; and
a first image display unit for displaying, via the display device, an image which is obtained through correction made by the first image correction unit.

9. A moving image reproduction system, comprising:
a display device for displaying image data; and
a moving image reproduction apparatus for reproducing, in a forward direction, moving image information which is generated by using: an initial image which is initially displayed; a shift amount representing an amount of a shift between display images of predetermined frames; and difference data representing a difference between an image obtained by shifting, by the shift amount, a display image of a preceding one of the predetermined frames, and a display image of a following one of the predetermined frames, and for displaying, via a display device, the moving image information having been reproduced, the initial image, the shift amount, and the difference data being stored in an image storage unit, the moving image reproduction apparatus comprising:
an unprocessed image display unit for displaying the initial image as an unprocessed image by means of the display device,
a first data reading unit for reading, from the image storage unit, the shift amount and the difference data corresponding to a reproduction time which immediately follows a reproduction time at which the unprocessed image is reproduced,
a first shifting execution unit for shifting the unprocessed image displayed via the display device, by the shift amount read by the first data reading unit,
a first image correction unit for correcting an image obtained by shifting the unprocessed image via the first shifting execution unit, by using the difference data read by the first data reading unit, and
a first image display unit for displaying, via the display device, an image which is obtained through correction made by the first image correction unit.

10. A method implemented using an information processing apparatus having one or more processors and for reproducing, in a forward direction, moving image information which is generated by using: an initial image which is initially displayed; a shift amount representing an amount of a shift between display images of predetermined frames; and difference data representing a difference between an image obtained by shifting, by the shift amount, a display image of a preceding one of the predetermined frames, and a display image of a following one of the predetermined frames, and for displaying, via a display device, the moving image information having been reproduced, the initial image, the shift amount, and the difference data being stored in an image storage unit, the method comprising:

displaying the initial image as an unprocessed image using the display device;

reading, from the image storage unit, the shift amount and the difference data corresponding to a reproduction time which immediately follows a reproduction time at which the unprocessed image is reproduced;

shifting, via the one or more processors, the unprocessed image displayed using the display device, by the read shift amount;

correcting an image obtained by shifting the unprocessed image, by using the read difference data; and displaying, via the display device, the corrected image.

\* \* \* \* \*